US009966720B2

(12) United States Patent
Liu et al.

(10) Patent No.: US 9,966,720 B2
(45) Date of Patent: May 8, 2018

(54) DIAMOND MASER AND MICROWAVE AMPLIFIER

(71) Applicant: THE CHINESE UNIVERSITY OF HONG KONG, Hong Kong (CN)

(72) Inventors: Renbao Liu, Hong Kong (CN); Liang Jin, Tianjin (CN)

(73) Assignee: The Chinese University of Hong Kong, Hong Kong (CN)

( * ) Notice: Subject to any disclaimer, the term of this patent is extended or adjusted under 35 U.S.C. 154(b) by 7 days.

(21) Appl. No.: 15/261,300

(22) Filed: Sep. 9, 2016

(65) Prior Publication Data

US 2017/0077665 A1 Mar. 16, 2017

Related U.S. Application Data

(60) Provisional application No. 62/216,673, filed on Sep. 10, 2015.

(51) Int. Cl.
| | | |
|---|---|---|
| H01S 3/30 | (2006.01) | |
| H01S 1/00 | (2006.01) | |
| H01S 4/00 | (2006.01) | |
| H01S 1/02 | (2006.01) | |
| H01S 3/10 | (2006.01) | |
| H01S 3/032 | (2006.01) | |
| H01S 3/06 | (2006.01) | |
| H01S 3/16 | (2006.01) | |

(52) U.S. Cl.
CPC .............. *H01S 1/005* (2013.01); *H01S 1/02* (2013.01); *H01S 4/00* (2013.01); *H01S 3/0326* (2013.01); *H01S 3/0602* (2013.01); *H01S 3/10007* (2013.01); *H01S 3/163* (2013.01)

(58) Field of Classification Search
CPC . H01S 1/005; H01S 4/00; H01S 3/163; H01S 3/0602; H01S 3/10007; H01S 3/0326
See application file for complete search history.

(56) References Cited

U.S. PATENT DOCUMENTS

| | | |
|---|---|---|
| 2,879,439 A | 3/1959 | Townes |
| 3,001,142 A | 9/1961 | Mims |
| 3,210,673 A | 10/1965 | Hoffmann |

(Continued)

FOREIGN PATENT DOCUMENTS

WO    WO-2014027205 A2    2/2014

OTHER PUBLICATIONS

Abe et al.; Electron spin ensemble strongly coupled to a three-dimensional microwave cavity; Applied Physics Letters 98; Jun. 21, 2011; pp. 251108-1 through 251108-3; American Institute of Physics.

(Continued)

*Primary Examiner* — Yuanda Zhang
(74) *Attorney, Agent, or Firm* — Saliwanchik, Lloyd & Eisenschenk

(57) ABSTRACT

Masers and microwave amplifiers that can function in the continuous-wave mode at room temperature are provided. The maser system can include a diamond gain medium having nitrogen-vacancy centers, and a resonator can be disposed around the gain medium. The resonator can be disposed in a cavity box, and radiation (e.g., visible light) can be provided to the gain medium to cause emission of microwave radiation.

14 Claims, 13 Drawing Sheets

(56) References Cited

U.S. PATENT DOCUMENTS

| | | | |
|---|---|---|---|
| 3,214,630 A | 10/1965 | Helmer et al. | |
| 3,255,423 A | 6/1966 | Ramsey et al. | |
| 4,809,281 A | 2/1989 | Neil et al. | |
| 5,274,658 A * | 12/1993 | Case | H01S 3/094 372/41 |
| 6,515,539 B1 * | 2/2003 | Levanon | H01S 1/02 330/4 |
| 2007/0091974 A1 * | 4/2007 | Hu | G02B 6/122 372/101 |

OTHER PUBLICATIONS

Acosta et al.; Diamonds with a high density of nitrogen-vacancy centers for magnetometry applications; Physical Review B 80; Sep. 9, 2009; pp. 115202-1 through 115202-15; The American Physical Society.

Acosta et al.; Temperature Dependence of the Nitrogen-Vacancy Magnetic Resonance in Diamond; Physical Review Letters; Feb. 17, 2010; pp. 070801-1 through 070801-4; The American Physical Society.

Acosta et al.; Optical properties of the nitrogen-vacancy singlet levels in diamond; Physical Review B 82; Rapid Communications; Nov. 17, 2010; pp. 201202-1 through 201202-4; The American Physical Society.

Anferova et al.; A Mobile NMR Device for Measurements of Porosity and Pore Size Distributions of Drilled Core Samples; Wiley InterScience: www.interscience.wiley.com; Aug. 3, 2004; pp. 26-32; Wiley Periodicals, Inc.

Balasubramanian et al.; Ultralong spin coherence time in isotopically engineered diamond; Nature Materials: www.nature.com/naturematerials; published online Apr. 6, 2009; May 2009; pp. 383-388; vol. 8; Macmillan Publishers Limited.

Balasubramanian et al.; Nanoscale imaging magnetometry with diamond spins under ambient conditions; Nature; Letters; Oct. 2, 2008; pp. 648-652; vol. 455; Macmillan Publishers Limited.

Benmessai et al.; Measurement of the Fundamental Thermal Noise Limit in a Cryogenic Sapphire Frequency Standard Using Bimodal Maser Oscillations; Physical Review Letters; Jun. 9, 2008; pp. 233901-1 through 233901-4; The American Physical Society.

Bohnet et al., A steady-state superradiant laser with less than one intracavity photon; Nature; Letter Research; Apr. 5, 2012; pp. 78-81; Supplemental Information: www.nature.com/nature; pp. 1-4; Macmillan Publishers Limited.

Clauss et al.; Chapter 3; Ruby Masers; Low-noise Systems in the Deep Space Network; Deep Space and Navigation Series; 2008; Title page and pp. 95-158; Jet Propulsion Laboratory.

Tsymbal et al. (ed); Handbook of Spin Transport and Magnetism; Apr. 19, 2016; Title page and pp. 316-321; CRC Press.

Dicke; Coherence in Spontaneous Radiation Processes; Physical Review; Jan. 1, 1954; pp. 99-110; vol. 93, No. 1.

Dogan et al.; Development of Halbach magnet for portable NMR device; Journal of Physics: Conference Series 153; 2009; pp. 1-8; IOP Publishing Ltd.

Doherty et al.; The nitrogen-vacancy colour centre in diamond; Physics Reports 528, Elsevier: www.elsevier.com/locate/phyrep; Mar. 4, 2013; pp. 1-45; Elsevier B.V.

Du et al.; Preserving electron spin coherence in solids by optimal dynamical decoupling; Nature, Letters; Oct. 29, 2009; pp. 1265-1268; Macmillan Publishers Limited.

Elitzur; Astronomical Masers; www.annualreviews.org; Annual Reviews Astronomy Astrophysics; 1992; pp. 75-112; Annual Reviews Inc.

Gordon et al.; Molecular Microwave Oscillator and New Hyperfine Structure in the Microwave Spectrum of $NH_3$; Physical Review 95, May 5, 1954; pp. 282-284.

Gordon et al.; The Maser—New Type of Microwave Amplifier, Frequency Standard, and Spectrometer; Physical Review; Aug. 15, 1955; pp. 1264-1274; vol. 99, No. 4.

Grezes et al.; Multimode Storage and Retrieval of Microwave Fields in a Spin Ensemble; Physical Review X 4; Jun. 16, 2014; pp. 021049-1 through 021049-9; Supplemental Information dated Jan. 28, 2014, pp. 1-19; The American Physical Society.

Halbach; Design of Permanent Multipole Magnets with Oriented Rare Earth Cobalt Material; Nuclear Instruments and Methods 169; 1980; pp. 1-10; North-Holland Publishing Co.

Harrison et al.; Optical spin polarisation of the N-V centre in diamond; Journal of Luminescence 107: www.elsevier.com/locate/jlumin; 2004; pp. 245-248; Elsevier B.V.

Hinkley et al.; An Atomic Clock with $10^{-18}$ Instability; downloaded from www.sciencemag.org on Feb. 5, 2015; *Science*; vol. 341; pp. 1215-1219; dated Sep. 13, 2013.

Ishikawa et al.; Optical and Spin Coherence Properties of Nitrogen-Vacancy Centers Placed in a 100nm Thick Isotopically Purified Diamond Layer.

Jarmola et al., Temperature- and Magnetic-Field-Dependent Longitudinal Spin Relaxation in Nitrogren-Vacancy Ensembles in Diamond, Physical Review Letters, May 11, 2012, pp. 197601-197601-5, American Physical Society.

Kleppner et al., Hydrogen-Maser Principles and Techniques, Physical Review, May 17, 1965, pp. A972-A983, vol. 138, No. 4A.

Kolobov et al., Role of pumping statistics and dynamicsof atomic polarization in quantum fluctuations of laser sources, Feb. 1993, pp. 1431-1446, vol. 47, No. 2, The American Physical Society.

Kraus et al., Room-temperature quantum microwave emitters based on spin defects in silicon carbide, Nature Physics, published online Dec. 8, 2013, pp. 1-6 (supplemental information pp. 1-6), Macmillan Publishers Limited.

Kubo et al., Strong Coupling of a Spin Ensemble to a Superconducting Resonator, Physical Review Letters, Oct. 1, 2010, pp. 140502-1-140502-4, The American Physical Society.

Kubo et al., Hybrid Quantum Circuit with a Superconducting Qubit Coupled to a Spin Ensemble, Physical Review Letters, Nov. 25, 2011, pp. 220501-1-220501-5 and 1-15, American Physical Society.

Le Floch et al., Invited Article: Dielectric material characterization techniques and designs of high-Q resonators for applications from micro to millimeter-waves frequencies applicable at room and cryogenic temperatures, Review of Scientific Instruments, Mar. 20, 2014, pp. 031301-1-031301-13, AIP Publishing LLC.

Manson et al., Nitrogen-vacancy center in diamond: Model of the electronic structure and associated dynamics, Sep. 21, 2006, pp. 104303-1-104303-11, The American Physical Society.

Maze et al., Nanoscale magnetic sensing with an individual electronic spin in diamond, Nature Letters, Oct. 2, 2008, pp. 644-648, vol. 455, Macmillan Publishers Limited.

Siegman et al., Microwave Solid-State Masers, 1964, pp. 183-250, McGraw-Hill.

Mizuochi et al., Coherence of single spins coupled to a nuclear spin bath of varying density, Physical Review B, Rapid Communications, Jul. 13, 2009, pp. 041201-1-041201-4, The American Physical Society.

Mollier et al., Theoretical and experimental sensitivities of ESR spectrometers using maser techniques, Rev. Sci. Instrum., Sep. 12, 1973, pp. 1763-1771, vol. 44, No. 12, The American Institute of Physics.

Neu et al., Electronic transitions of single silicon vacancy in the near-infrared spectral region, Physical Review B, Jun. 13, 2012, pp. 245207-1-245207-8, American Physical Society.

Neumann et al., Excited-state spectroscopy of single NV defects in diamond using optically detected magnetic resonance, New Journal of Physics, Jan. 7, 2009, pp. 1-10, IOP Publishing LTD. and Deutsche Physikalishe Gesellschaft.

Oxborrow et al., Room-temperature solid-state maser, Nature Letter, Aug. 16, 2012, pp. 353-356, vol. 488, Macmillan Publishers Limited.

Pham et al., Magnetic Field imaging with nitrogen-vacancy ensembles, New Journal of Physics, Apr. 28, 2011, pp. 1-14, IOP Publishing LTD. and Deutsche Physikalishe Gesellschaft.

Phillips, History of the Ubitron, Nuclear Instruments and Methods in Physics Research A272, pp. 1-9.

(56) References Cited

OTHER PUBLICATIONS

Probst et al., Three-dimensional cavity quantum electrodynamics with a rare-earth spin ensemble, Physical Review B, Rapid Communications, Sep. 12, 2014, pp. 100404-1-100404-5, American Physical Society.

Putz et al., Protecting a spin ensemble against decoherence in the strong-coupling regime of cavity QED, Nature Physics, Aug. 17, 2014, pp. 720-724 (supplemental information pp. 1-7) vol. 10, Macmillan Publishers Limited.

Raich et al., Design and Construction of a Dipolar Halbach Array with a Homogenous Field from Identifcal Bar Magnets: NMR Mandhalas, Wiley InterScience www.interscience.wiley.com, Jul. 1, 2004, pp. 16-25, Wiley Periodicals, Inc.

Redman et al., Spin Dynamics and Electronic States of N-V Centers in Diamond by EPR and Four-Wave-Mixing Spectroscopy, Physical Review Letters, Dec. 9, 1991, pp. 3420-3423, vol. 67, No. 24, The American Physical Society.

Robledo et al., Spin Dynamicsin the optical cycle of single nitrogen-vacancy centres in diamond, New Journal of Physics, Feb. 21, 2011, pp. 1-11, IOP Publishing LTD. and Deutsche Physikalishe Gesellschaft.

Shi et al., Sensing and atomic-scale structure analysis of single nuclear-spin clusters in diamond, Nature Physics, Nov. 24, 2013, pp. 1-5, Macmillan Publishers Limited.

Dobrovinskaya et al., Sapphire: Material, Manufacturing, Applications, 2009, pp. 80-126, Springer.

Major et al., The Quantum Beat: Principles and Applications of Atomic Clocks, 2007, pp. 232-376, Springer.

Takahashi et al., Quenching Spin Decoherence in Diamond through Spin Bath Polarization, Physical Review Letters, Jul. 25, 2008, pp. 047601-1-047601-1-047601-4, The American Physical Society.

Tetienne et al., Magnetic-field-dependent photodynamics of single NV defects in diamond: an application to qualitative all-optical magnetic imaging, New Journal of Physics, Oct. 19, 2012, pp. 1-15, IOP Publishing LTD. and Deutsche Physikalishe Gesellschaft.

Tobar et al., Sapphire-Rutile Frequency-Temperature Compensated Whispering Gallery Microwave Resonators, IEEE International Frequency Control Symposium, 1997, pp. 1000-1008, IEEE.

Toyli et al., Measurement and Control of Single Nitrogen-Vacancy Center Spins above 600 K, Physical Review X, Jul. 5, 2012, 031001-031001-7, The American Physical Society.

Vessot, The atomic hydrogen maser oscillator, Metrologia, Jun. 7, 2005, pp. S80-S89, Institute of Physics Publishing, UK.

Wee et al., Two-photon Excited Fluorescence of Nitrogen-Vacancy Centers in Proton-Irradiated Type Ib Diamond, J. Phys. Chem. A, May 22, 2007, pp. 9379-9386, vol. 111, No. 38, The American Chemical Society.

Widmann et al., Coherent control of single spins in silicon carbide at room temperature, Nature Materials, Dec. 1, 2014, pp. 164-168, vol. 14, Macmillan Publishers Limited.

Wrachtrup, Defect center room-temperature quantum processors, www.pnas.org/cgi/doi/10.1073/pnas.1004033107, May 25, 2010, pp. 9479-9480, vol. 107, No. 1.

Zaks et al., Experimental observation of electron-hole recollisions, Nature, Mar. 29, 2012, pp. 580-583, vol. 483, Macmillan Publishers Limited.

Zhang et al., Strongly Coupled Magnons and Cavity Microwave Photons, Physical Review Letters, Oct. 10, 2014, pp. 156401-1156401-5 (Supplemental Information pp. 1-2), American Physical Society.

Zhao et al., Atomic-scale magnetometry of distant nuclear spin clusters via nitrogen-vacancy spin in diamond, Nature Nanotechnology Letters, Feb. 27, 2011, pp. 242-246, vol. 6, Macmillan Publishers Limited.

Zhao et al., Sensing single remote nuclear spins, Nature Nanotechnology Letters, Sep. 2, 2012, pp. 657-662, vol. 7, Macmillan Publishers Limited.

Wang, Zhi-Hui et al., Spin decoherence and electron spin bath noise of a nitrogen-vacancy center in diamond, Physical Review B, 2013, 87(11):1-16, 115122.

* cited by examiner

DIAMOND MASER AND MICROWAVE AMPLIFIER

CROSS-REFERENCE TO A RELATED APPLICATION

This application claims the benefit of U.S. Provisional Application Ser. No. 62/216,673, filed Sep. 10, 2015, which is hereby incorporated by reference herein in its entirety, including any figures, tables, or drawings.

BACKGROUND

Laser (light amplification by stimulated emission of radiation) has revolutionized optical science and technology, but the microwave counterpart thereof, maser (microwave amplification by stimulated emission of radiation) has not reached the same level of use. A main difficulty is that all existing masers demand harsh working conditions that limit the maser applications. For example, gas masers require a high vacuum, free electron masers require large accelerators, and solid-state masers typically function only at cryogenic temperatures. The only existing room-temperature solid-state maser is based on pentacene-doped p-terphenyl molecular crystals (Oxborrow et al., *Nature* 488, 2012). This pentacene maser has a high pump threshold (~230 W) and operates only in the pulse mode. In addition, the organic crystal material of the maser is unstable under a strong optical pump.

BRIEF SUMMARY

Embodiments of the subject invention provide advantageous masers and microwave amplifiers, as well as methods of fabricating the same and methods of using the same. A maser or amplifier of the subject invention can function at room temperature in the continuous-wave mode. The maser can be a diamond maser, and the emitters can be nitrogen-vacancy (NV) centers in the diamond.

In an embodiment, a maser system can include a gain medium, a resonator disposed around the gain medium, and a cavity box disposed around the resonator. The gain medium can include diamond having a plurality of NV centers. Radiation (e.g., visible light) can be provided to the gain medium to cause emission of microwave radiation. If the pump rate of the provided radiation is high enough for spin population inversion, the system can operate as a maser (if the cavity Q factor is at or above the masing threshold) or a microwave amplifier (if the cavity Q factor is below the masing threshold). In a further embodiment, the maser system can further include a magnet array disposed around the gain medium (for example, disposed around the cavity box).

DETAILED DESCRIPTION

Figure 1:
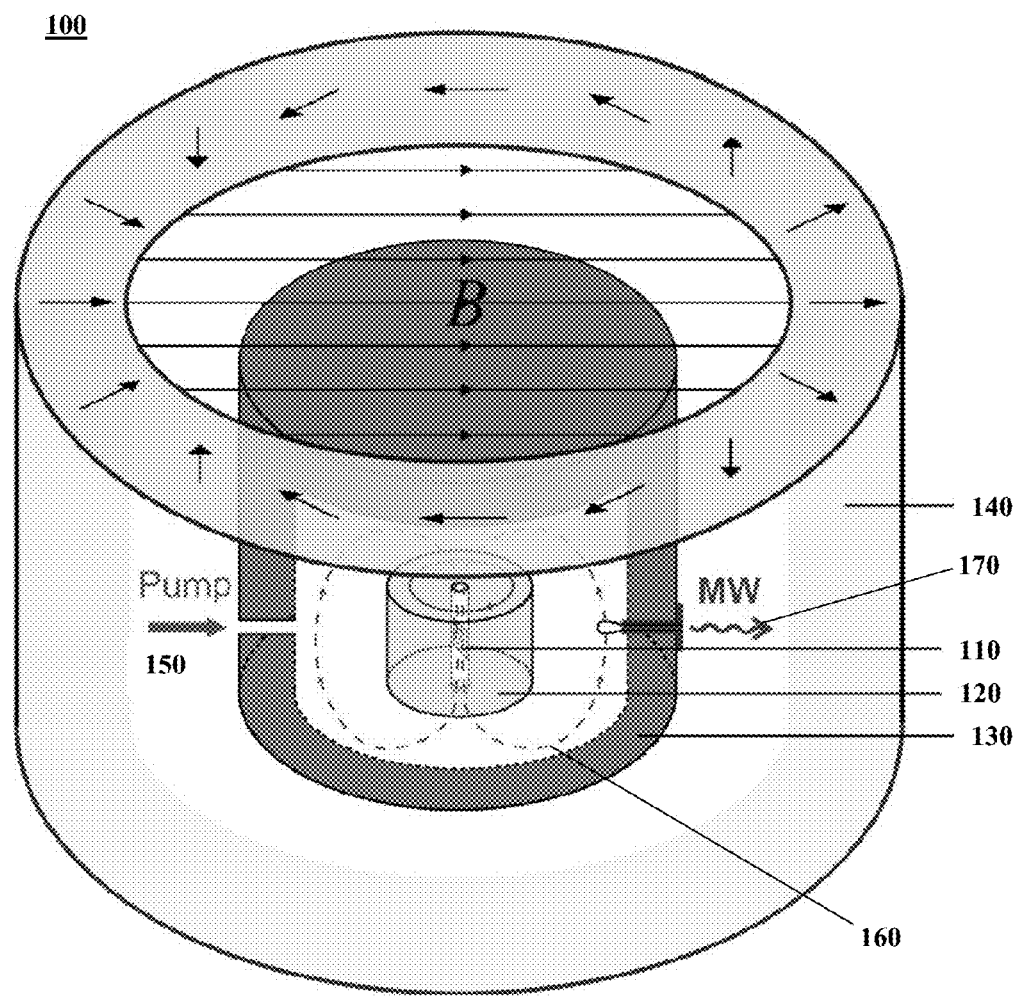
FIG. 1 shows a schematic view of a device according to an embodiment of the subject invention.

Embodiments of the subject invention provide advantageous masers and microwave amplifiers, as well as methods of fabricating the same and methods of using the same. A maser or amplifier of the subject invention can function at room temperature (e.g., 300 Kelvin) in the continuous-wave mode. The maser can be a diamond maser, such that gain medium is a diamond, and the emitters can be nitrogen-vacancy (NV) centers in the diamond; the NV centers can be negatively-charged. The diamond gain medium can be, for example, a single crystal bulk diamond, such as a high-pressure high-temperature (HPHT)- or chemical vapor deposition (CVD)-synthesized, single-crystal, bulk diamond. The diamond can have a size on the order of millimeters, though embodiments are not necessarily limited thereto. The NV center concentration within the diamond can be on the order of parts per million (ppm), though embodiments are not limited thereto. Room-temperature diamond masers of the subject invention have numerous applications, including but not necessarily limited to enhanced magnetic resonance spectroscopy, high-precision clocks, deep-space communication, navigation, radar and positioning, and cosmology observation.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The lifetime of emitters in solids at room temperature is usually too short for population inversion under practical pump conditions. The long spin lifetime in organic materials has enabled a room-temperature solid-state maser that functions only at the pulsed mode with a low repetition rate (about 1 Hz; Oxborrow et al., *Nature* 488, 2012). NV centers feature the longest known spin lifetime at room temperature among all solid-state systems, at about 5 milliseconds (ms), and high optical pumping efficiency, at about $10^6$ s$^{-1}$. Devices of the subject invention can achieve low pump thresholds for both microwave amplifying (about 2.7 Watts (W)) and masing (about 4.3 W), with a readily-accessible cavity Q factor of about 50,000. Masing can be achieved with a coherence time on the order of minutes and with high magnetometry sensitivity (e.g., less than 10 picoTesla per Hertz$^{1/2}$ (pT·Hz$^{-1/2}$)). Room-temperature diamond masers of the subject invention provide new stages for studying macroscopic quantum coherence in spin ensembles and can facilitate a broad range of microwave technologies.

Masers can operate in the microwave waveband (i.e., frequency of about 0.3 to 300 gigaHz (GHz) or wavelength of about 1 meter (m) to 1 millimeter (mm)) and have important applications, such as in ultrasensitive magnetic resonance spectroscopy, astronomy observation, space communication, radar, and high-precision clocks. Such applications are hindered by the demanding operation conditions of related art masers (e.g., high vacuum for gas masers, and liquid-helium temperatures for solid-state masers). The room-temperature solid-state masers of the subject invention are thus highly desirable.

Important aspects of a maser include population inversion of the emitters and macroscopic coherence among microwave photons. Population inversion requires a spin relaxation rate lower than the pump rate, and this can be a bottleneck in room-temperature solid-state masers, as the spin relaxation times in solids are usually extremely short (on the order of nanoseconds (ns)) at room temperature due to rapid phonon scattering. The spin relaxation induced by phonon scattering can be largely suppressed in light-element materials, such as organic materials, where the spin-orbit coupling is weak. The only known room-temperature solid-state maser in the related art is based on a pentacene-doped p-terphenyl molecular crystal, where the spin lifetime can reach 135 is at room temperature (Oxborrow et al., Nature 488, 2012). However, the active spins in pentacene-doped p-terphenyl are intermediate metastable states instead of the ground states. Such an energy level structure greatly reduces the optical pumping efficiency and requires high pump laser power (about 230 W). Additionally, the material instability of p-terphenyl molecular crystal requires pulsed mode with a repetition rate of about 1 Hz.

Silicon vacancy ($V_{Si}$) centers within a silicon carbide medium can be attempted to be used for a maser. The $V_{Si}$ center has a spin-3/2 ground state, which allows population inversion by optical pump. The spin lifetime is about 0.5 ms at room temperature, and it may be possible to produce stimulated microwave emission from $V_{Si}$ centers at room temperature. However, maser action has not been achieved using $V_{Si}$ centers in silicon carbide. Masing from the silicon carbide spins has not been achieved, and the challenges include the complexity of defects in the compound material and the difficulty of engineering the $V_{Si}$ centers.

NV center spins in diamond can be useful for quantum information processing and sensing, due to their long coherence time at room temperature and high efficiencies of initialization by optical pumping and readout via photon detection. In particular, coupling between ensemble NV center electron spins and superconducting resonators can be used for quantum information storage and retrieval in hybrid quantum systems at cryogenic temperatures. Enhanced quantum coherence of NV center ensembles has been observed in the strong coupling regime at low temperature, and the superb spin coherence features of NV centers persist at room temperature and even at temperatures up to at least 600 K or higher.

NV centers in diamond possess many features that are advantageous for a room-temperature solid-state maser. NV center spins have the longest known lifetime (about 5 ms) at room temperature among all solid-state spins—about 50 times longer than the lifetime of about 0.1 ms in pentacene-doped p-terphenyl and about 10 times longer than the lifetime of about 0.5 ms in silicon carbide. The spin is a triplet (spin-1) in the ground state and can be optically pumped rapidly to the $m_s=0$ ground state, with a pump rate as high as $\sim 10^6$ s$^{-1}$, compared to a pump rate of about $10^3$ to $10^5$ s$^{-1}$ in organic materials and about $10^5$ s$^{-1}$ in silicon carbide). Population inversion can be easily achieved if a magnetic field is applied to shift the $m_s=0$ ground state to above another spin state. In addition, the good thermal conductivity and material stability of diamond are also advantageous for masers.

FIG. 1 shows a schematic view of a maser according to an embodiment of the subject invention. Referring to FIG. 1, the maser 100 can include a gain medium 110 fixed inside a resonator 120. The maser 100 can further include a cavity box 130 around the resonator 120, and a magnet array 140 can be provided around the cavity box 130. The gain medium 110 can be fixed inside the resonator 120. The magnet array 140 can provide a homogenous magnetic field B. The magnetic field can be large, such as 2,000 Gauss, 1,028 Gauss, at least 1,028 Gauss, or at least 2,000 Gauss. Though FIG. 1 shows the pole direction for sixteen magnets in the magnet array 140, this is for demonstrative purposes only and embodiments are not limited thereto. That is, the magnet array 140 could have any number of magnets (2 or more). The cavity box 130 can be a high conductivity material (for example, a metal such as copper, though embodiments are not limited thereto).

The green line (on the left, under "Pump") in FIG. 1 represents electromagnetic radiation 150 (e.g., light) that can be pumped (e.g., by an optical pump such as an optical laser) into the cavity box 130, and the solid red line (on the right, under "MW") represents microwave radiation 170 that can be emitted out of the cavity box 130. The radiation 150 can be provided to the cavity box 130 via, e.g., an opening in the cavity box 130. For example, an optical pump can be disposed within the magnet array 140 to pump the electromagnetic radiation 150 into the cavity box 130. The microwave radiation 170 can be output from the loop coupling to the magnetic field 160 (looping, dashed red lines) emanating from the gain medium 110. For example, the microwave radiation 170 can be output from the loop coupling to a $TE_{01\delta}$ mode magnetic field 160 emanating from the gain medium 110. The electromagnetic radiation 150 can be visible light (e.g., light at 532 nm) and can be provided by an optical pump, though embodiments are not limited thereto.

The gain medium 110 can be, for example, diamond, such as a single crystal diamond including NV centers. The resonator 120 can be a microwave dielectric resonator. For example, the resonator 120 can be a sapphire dielectric resonator. The resonator 120 can be disposed on a support, such as a quartz support within the cavity box 130, though embodiments are not limited thereto. The magnet array 140 can be, for example, a Halbach magnet array (Halbach, Nucl. Instru. Methods 169, 1980, which is incorporated herein by reference in its entirety), and it can include, for example, sixteen magnets, though embodiments are not limited thereto. In certain embodiments, one or more of the gain medium 110, the resonator 120, the cavity box 130, and the magnet array 140 can have a cylindrical shape. One or more of these elements may be coaxial with each other. In a particular embodiment, the resonator 120, the cavity box 130, and the magnet array 140 can all have a cylindrical shape (may or may not be coaxial), with the gain medium 110 optionally having a cylindrical shape. In one embodiment, the magnet array 140 can be provided within the cavity box 130.

In one embodiment, a maser system, which can be used as a maser or a microwave amplifier, can include a single crystal diamond having NV centers within a cylindrical sapphire dielectric resonator, which is disposed on a quartz support inside a coaxial cylindrical cavity. The cylindrical cavity can be disposed in a homogenous magnetic field provided by a Halbach magnet array (e.g., such as an array with sixteen magnets). The power gain, G, of the amplifier can be defined as the output power divided by the input power.

In alternative embodiments, the gain medium, resonator, and cavity box can have other shapes, such as box shapes, cubes, parallelepipeds, or irregular shapes, These elements can be shaped differently from each other, with, for example, at least one having a cylindrical shape and the other(s) having non-cylindrical shapes. In addition, in certain embodiments, regardless of shape of the elements, the magnet array can be omitted. Instead, for example, a single magnet (e.g., an annulus-shaped magnet) can be provided or no magnet can be provided as part of the system. In a further embodiment, a single magnet can be provided within the cavity box.

Figure 5:
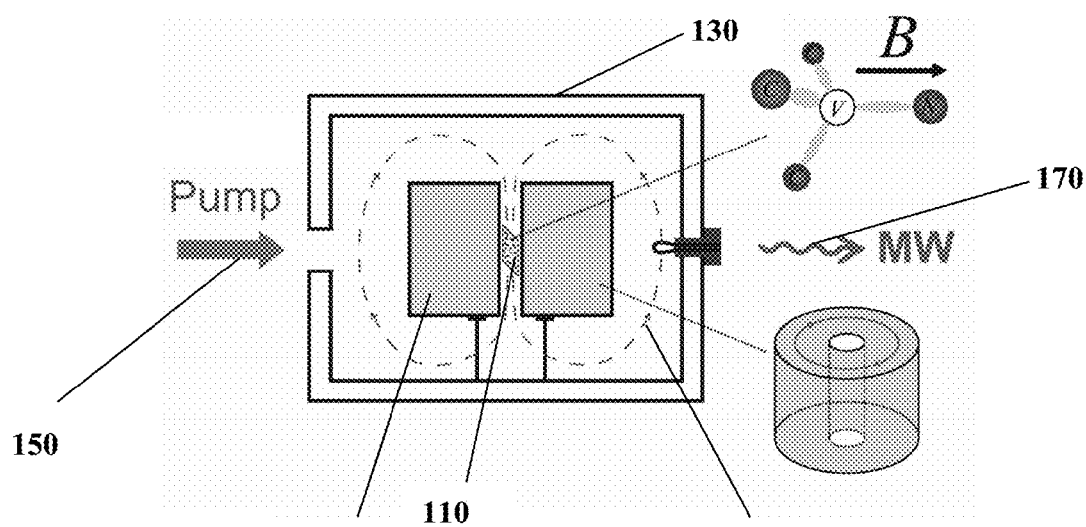
FIG. 5 shows a schematic view of a device according to an embodiment of the subject invention.
Figure 6:
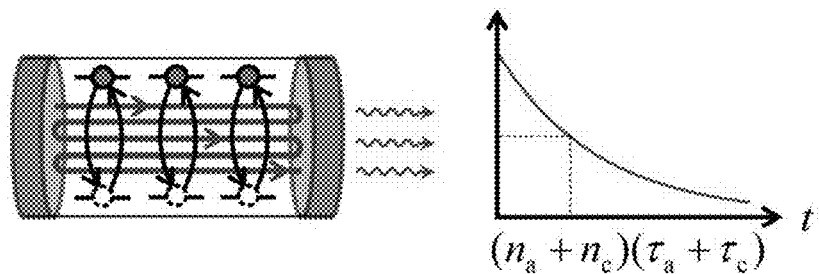
FIG. 6 shows a schematic representation of the time for random phase of photons/magnons.

FIG. 5 shows a schematic view of a system according to an embodiment of the subject invention. Referring to FIG. 5, the cavity box 130 can have a rectangular cross-section (e.g., it can have a parallelepiped shape). A single magnet can be provided within the cavity box 130 around the gain medium 110, which can be a single crystal diamond with NV centers. The system can operate similarly to that depicted in FIG. 1, with electromagnetic radiation 150 (e.g., light) pumped (e.g., by an optical pump) into the cavity box 130 and microwave radiation 170 emitted out of the cavity box 130. The microwave radiation 170 can be output from the loop coupling to the magnetic field 160 emanating from the gain medium 110. For example, the microwave radiation 170 can be output from the loop coupling to a $TE_{01\delta}$ mode magnetic field 160 emanating from the gain medium 110. The electromagnetic radiation 150 can be visible light (e.g., light at 532 nm) and can be provided by an optical pump, though embodiments are not limited thereto.

The NV center ground state can be rapidly pumped by an optical laser into the $m_s=0$ state with a pump rate up to about $10^6$ $s^{-1}$. Thus, the spin population can be inverted under continuously optical pumping. A 532 nm green laser can excite the NV center triplet ground state $^3A_2$ to the excited vibronic states, which decay to the triplet excited state $^3E$. The $m_s=0$ excited state can almost fully decay to the $m_s=0$ ground state via spin-conserving photon emission. However, the $m_s=\pm1$ excited states can decay to the ground state either by spin-conserving photon emission or by spin non-conserving relaxation via the singlet state $^1A_1$ and the metastable state $^1E$ due to the inter-system crossing. The spin conserving emission and the inter-system crossing have similar rates. Under continuous optical pumping, the $m_s=-1$ ground state can be pumped to the $m_s=0$ ground state with a success probability of about ¼ in each excitation event. Due to multiple pathways of the pump process, the incoherent optical pump of NV centers can destroy the collective mode at a rate of about 16w for an effective pump rate w from state $m_s=-1$ to $m_s=0$. The pump power can be expressed as $P_{pump}=(S/\sigma)(4w)$, where $\hbar\omega_p=3.74\times10^{-19}$ J is the 532 nm photon energy, S is the light spot illuminating area, and $\sigma\approx3.1\times10^{-17}$ cm$^2$ is the 532 nm absorption cross section of an NV center. The NV centers absorbed power can be $\hbar\omega_p=(12N)(4w)$.

The dephasing of the NV center spins ensemble can be mainly caused by the hyperfine interaction with $^{13}C$ nuclear spins, the dipolar interaction with the P1 center electron spins, and the zero-field splitting (ZFS) fluctuations. Summing up all these contributions, the dephasing time can be estimated to be $T^*_2=0.4$ µs. At room temperature, the spin-lattice relaxation of an NV center can be temperature dependent and approximately sample-independent. A relaxation time of, for example, $T_1=5$ ms ($\gamma_{eg}=200$ s$^{-1}$) at 300 K can be adopted. The total decay rate of the collective mode can include the spin dephasing, the spin-lattice relaxation, and the incoherent pump, which is $\kappa_S=\gamma_{eg}=+2/T^*_2+16w$.

The gain medium can be on the order of mm. For example, the gain medium can have a volume of less than 10 mm$^3$. In a particular embodiment, the gain medium can have a volume of 4.5 mm$^3$ (3 mm×3 mm×0.5 mm). The resonator can also be on the order of mm in each dimension. For example, the resonator can have a volume of less than 20 cm$^3$. In a particular embodiment, a cylindrical resonator can have a volume of about 11.3 cm$^3$ (radius of 15 mm and height of 16 mm). The cavity box can also be on the order of mm in each dimension. For example, the cavity box can have a volume of less than 300 cm$^3$. In a particular embodiment, a cylindrical cavity box can have a volume of about 201 cm$^3$ (radius of 40 mm and height of 40 mm). The magnet array can also be on the order of mm in each dimension. For example, the magnet array can have an inner volume of less than 400 cm$^3$. In a particular embodiment, a magnet array can have an inner volume of about 314 cm$^3$ (e.g., an annulus or an annular cylinder with a center section cut out, as depicted in FIG. 1) magnet array with an inner radius of 50 mm and height of 40 mm; the outer radius can be, for example 80 mm). The Q factor of the system can be, for example, on the order of $10^5$.

In an embodiment, a Halbach magnet array ring (a cylindrical, annular array) can provide a stable and uniform magnetic field along the NV axis of a diamond gain medium having NV centers. The magnetic field can have inhomogeneity of less than 0.0005% across the diamond gain medium (e.g., inhomogeneity of less than 0.01 Gauss for a 2,100 Gauss magnetic field). The magnetic field can be set perpendicular to the cavity axial direction for a cylindrical cavity. In a particular embodiment, a 2,100 Gauss external magnetic field can result in an NV spin transition frequency on the order of GHz, and this can be resonant with the microwave cavity $TE_{01\delta}$ mode frequency, i.e., $\omega_c=\omega_s$.

Analysis of masers involves the use of the standard Langevin equations (Kolobov et al., *Phys. Rev. A* 47, 1993, which is incorporated herein by reference in its entirety):

$$\frac{d\hat{N}_e}{dt} = +w\hat{N}_g - \gamma_{eg}\hat{N}_e + ig(\hat{a}^\dagger\hat{S}_- - \hat{S}_+\hat{a}) + \hat{F}_e, \quad (1)$$

$$\frac{d\hat{N}_g}{dt} = -w\hat{N}_g + \gamma_{eg}\hat{N}_e - ig(\hat{a}^\dagger\hat{S}_- - \hat{S}_+\hat{a}) + \hat{F}_g,$$

$$\frac{d\hat{S}_-}{dt} = -i\omega_S\hat{S}_- - \frac{\kappa_S}{2}\hat{S}_- + ig(\hat{N}_e - \hat{N}_g)\hat{a} + \hat{F}_S,$$

$$\frac{d\hat{a}}{dt} = -i\omega_c\hat{a} - \frac{\kappa_c}{2}\hat{a} - ig\hat{S}_- + \hat{F}_c,$$

where $\hat{F}_{c/S/e/g}$ is the noise operator that causes the decay of the photons (c), the spin collective modes (S), the population in the excited state (e), or that in the ground state (g). The total spin number can be written as an operator $\hat{N}$ to take into account the fluctuation due to population of the third spin state $|+1\rangle$ and other intermediate states. The population fluctuation, though, can have little to no effect on the phase fluctuation of the maser.

By replacing the operators with their expectation values, the mean-field equations for a maser at the steady-state can be obtained:

$$0 = wN_g - \gamma_{eg}N_e + ig(a^*S_- - S_+a), \quad (2)$$

$$0 = i(\omega - \omega_S)S_- - \frac{\kappa_S}{2}S_- + igS_z a,$$

$$0 = i(\omega - \omega_c)a - \frac{\kappa_c}{2}a - igS_-,$$

from which the masing frequency, the field amplitudes, and the spin polarization can be straightforwardly calculated.

The coherence time and linewidth are calculated using the spectrum of the phase fluctuations. The Langevin equations are linearized for the fluctuations, which are much smaller than the expectation values at steady-state. The linearized equations are $$\frac{d\delta\hat{N}_e}{dt} = \quad (3)$$
$$+w\delta\hat{N}_g - \gamma_{eg}\delta\hat{N}_e + ig(S_-\delta\hat{a}^\dagger - S_+\delta\hat{a}) + ig(a^*\delta S_- - a\delta\hat{S}_+) + \hat{F}_e,$$

$$\frac{d\delta\hat{N}_g}{dt} = -w\delta\hat{N}_g + \gamma_{eg}\delta\hat{N}_e -$$
$$ig(S_-\delta\hat{a}^\dagger - S_+\delta\hat{a}) - ig(a^*\delta S_- - a\delta\hat{S}_+) + \hat{F}_g,$$

$$\frac{d\delta\hat{S}_-}{dt} = -\frac{\kappa_S}{2}\delta\hat{S}_- + igS_z\delta\hat{a} + iga(\delta\hat{N}_e - \delta\hat{N}_g) + \hat{F}_S,$$

$$\frac{d\delta\hat{a}}{dt} = -\frac{\kappa_c}{2}\delta\hat{a} - ig\delta\hat{S}_- + \hat{F}_c.$$

By Fourier transform of these equations, the spectrum of the phase noise can be calculated and hence the maser linewidth can be determined. To investigate the correlations in both the masing and the incoherent emission regimes, the equations for the correlation functions can be derived, and the expectation values of the relevant operators can be taken. That leads to:

$$\frac{d\langle\hat{N}_e\rangle}{dt} = +w\langle\hat{N}_g\rangle - \gamma_{eg}\langle\hat{N}_e\rangle + ig(\langle\hat{a}^\dagger\hat{S}_-\rangle - \langle\hat{S}_+\hat{a}\rangle), \quad (4)$$

$$\frac{d\langle\hat{N}_g\rangle}{dt} = -w\langle\hat{N}_g\rangle + \gamma_{eg}\langle\hat{N}_e\rangle - ig(\langle\hat{a}^\dagger\hat{S}_-\rangle - \langle\hat{S}_+\hat{a}\rangle),$$

$$\frac{d\langle\hat{a}^\dagger\hat{S}_-\rangle}{dt} = -\frac{\kappa_S+\kappa_c}{2}\langle\hat{a}^\dagger\hat{S}_-\rangle + ig\left[\left(1-\frac{1}{N}\right)\langle\hat{S}_+\hat{S}_-\rangle + \langle\hat{N}_e\rangle + \langle\hat{a}^\dagger\hat{a}\rangle\langle\hat{S}_z\rangle\right],$$

$$\frac{d\langle\hat{S}_+\hat{S}_-\rangle}{dt} = -\kappa_S\langle\hat{S}_+\hat{S}_-\rangle - ig\langle\hat{S}_z\rangle(\langle\hat{a}^\dagger\hat{S}_-\rangle - \langle\hat{S}_+\hat{a}\rangle),$$

$$\frac{d\langle\hat{a}^\dagger\hat{a}\rangle}{dt} = -\kappa_c\langle\hat{a}^\dagger\hat{a}\rangle - ig(\langle\hat{a}^\dagger\hat{S}_-\rangle - \langle\hat{S}_+\hat{a}\rangle) + \kappa_c n_{th}.$$

To make the equations close, the following approximations can be used—$\langle\hat{a}^\dagger\hat{a}\hat{S}_z\rangle \approx \langle\hat{a}^\dagger\hat{a}\rangle\langle\hat{S}_z\rangle$, $\langle\hat{a}^\dagger\hat{S}_z\hat{S}_-\rangle \approx \langle\hat{S}_z\rangle\langle\hat{a}^\dagger\hat{S}_-\rangle$, and $\langle\hat{S}_+\hat{S}_z\hat{a}\rangle \approx \langle\hat{S}_z\rangle\langle\hat{S}_+\hat{a}\rangle$,— neglecting the higher-order correlations, which is well justified for Gaussian fluctuations.

To investigate the microwave amplifier, the mean-field equations can be solved with a steady-state input $s_{in}e^{-i\omega_{in}t}$ as $$0 = wN_g - \gamma_{eg}N_e + ig(a^*S_- - S_+a), \quad (5)$$

$$0 = i(\omega_{in} - \omega_S)S_- - \frac{\kappa_S}{2}S_- + igS_z a,$$

$$0 = i(\omega_{in} - \omega_c)a - \frac{\kappa_c}{2}a - igS_- + \sqrt{\kappa_{ex}}\, s_{in},$$

$$s_{out} = s_{in} - \sqrt{\kappa_{ex}}\, a,$$

from which the power gain $G = |s_{out}|^2/|s_{in}|^2$ can be obtained. Maximum gain $G \gg 1$ can be possible under the resonant condition $\omega_{in} = \omega_c = \omega_S$, but can be reduced to O(1) at off-resonance, i.e., $|\omega_{in}-\omega_{S,c}|/\kappa_{S,c} \gtrsim 1$. The intrinsic noise temperature of the diamond maser can be given by:

$$T_n = (1-G^{-1})\left[\frac{L_{dB}}{G_{dB}}T + \left(1+\frac{L_{dB}}{G_{dB}}\right)\frac{N_e}{S_z}\frac{\hbar\omega_c}{k_B}\right], \quad (6)$$

where T is the environment temperature, $G_{dB}=10\log_{10}G$, and $L_{dB}=-10\log_{10}e^{-\kappa_c T\tau_n}$ is the cavity power loss in decibels during the time of a microwave photon roundtrip $\tau_{rt}=2[R+(r-r_0)(\sqrt{\varepsilon_r}-1)]/c$ [$\varepsilon_r \approx 10$ is the sapphire dielectric permittivity in the direction perpendicular to the c-axis (resonator axis) of the sapphire crystal, R is the radius of the cylindrical cavity, and r ($r_0$) is the external (internal) radius of the dielectric resonator.

Figure 2A:
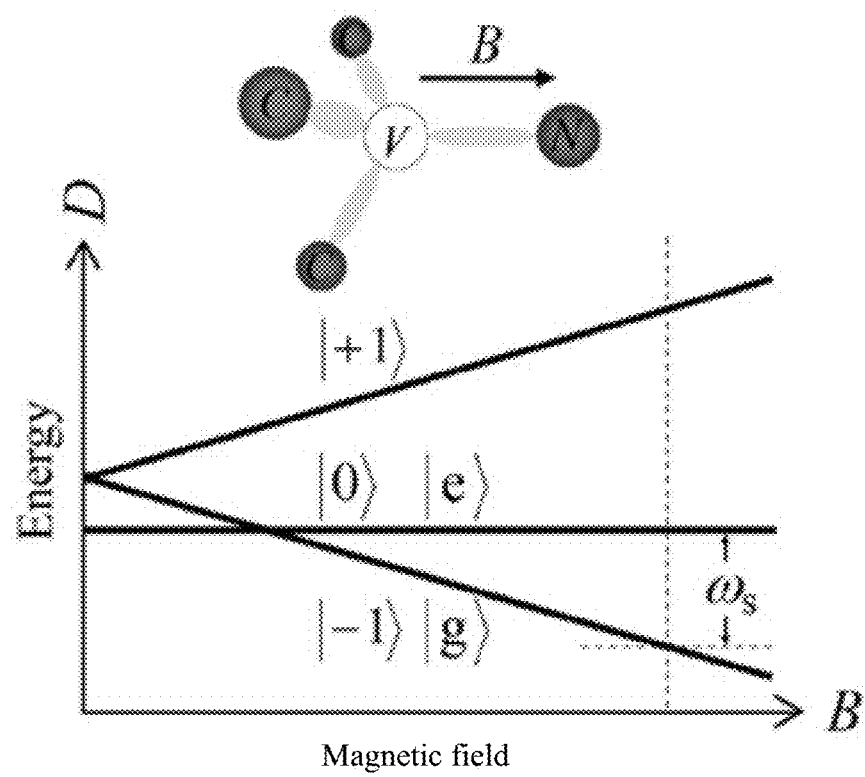
FIG. 2A shows a plot of energy versus magnetic field of a nitrogen vacancy center.
Figure 4:
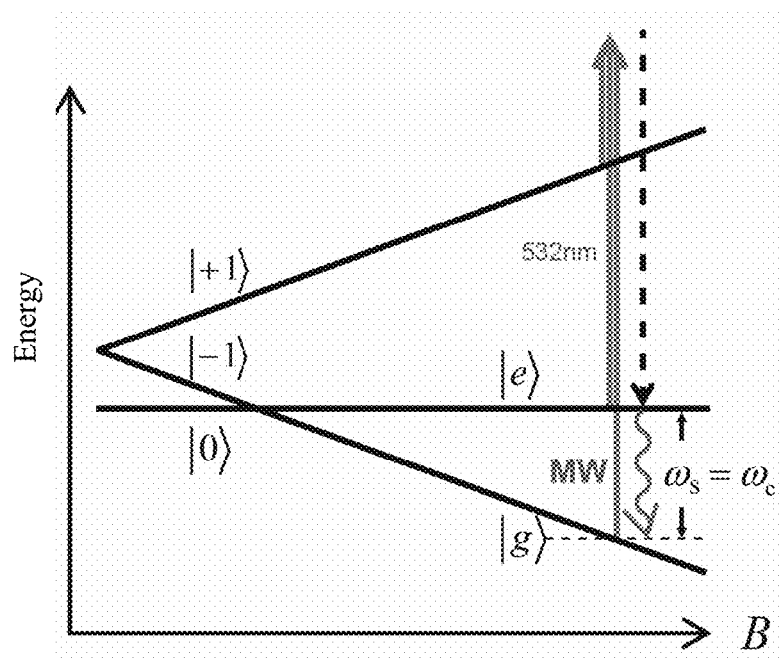
FIG. 4 shows a plot of energy versus magnetic field of a nitrogen vacancy center.

In many embodiments, a plurality of NV centers can be present within a gain medium (e.g., diamond) and coupled to a high Q factor microwave cavity. The spin sublevels $|m_s\rangle$ ($m_s=1$ or $m_s=\pm 1$) of the NV triplet ground state can have a zero-field splitting of about 2.87 GHz between $|0\rangle$ and $|\pm 1\rangle$ [11] (see FIGS. 2A and 4). The NV centers can be optically pumped to the state $|0\rangle$ [11]. A moderate external magnetic field (e.g., >1,000 Gauss) can split the states $|\pm 1\rangle$ and shift the $|-1\rangle$ state to below $|0\rangle$ so that the spins can be inverted by an optical pump (see FIG. 2B). The transition frequency $\omega_s$ between the spin ground state $|g\rangle \equiv |1\rangle$ and the spin exited state $|e\rangle \equiv |0\rangle$ can be tuned to be resonant with the microwave cavity frequency $\omega_c$.

The maser can be driven by coupling between the cavity mode and the spins. The Hamiltonian of the coupled spin-cavity system can be $H_1 = \sum_{j=1}^N g_j(\hat{a}\hat{s}_j^+ + \hat{a}^\dagger\hat{s}_j^-)$, where $\hat{a}$ annihilates a microwave cavity photon, $\hat{s}_j^+ \equiv |e\rangle_{jj}\langle g|$ is the raising operator of the j-th spin, $\hat{s}_j^-$, and $g_j$ is the coupling constant. Without changing the essential results, the spin-photon coupling can be assumed to be uniform, i.e., $g_j = g$, and the Hamiltonian can be expressed as $H_1 = g(\hat{a}\hat{S}_+ + \hat{a}^\dagger\hat{S}_-)$, with the collective operators $\hat{S}_\pm \equiv \sum_{j=1}^N \hat{s}_j^\pm$, which satisfy the commutation relation $[\hat{S}_+,\hat{S}_-] = \sum_{j=1}^N (|e\rangle_{jj}\langle e| - |g\rangle_{jj}\langle g|) \equiv \hat{S}_z$. When masing occurs, the spin polarization (or population inversion) $S_z \equiv \langle\hat{S}_z\rangle$ can be a macroscopic number [~O(N)] while the fluctuation $\delta\hat{S}_z \equiv \hat{S}_z - S_z \sim O(N^{1/2})$ can be much smaller.

Therefore, $\hat{b}^\dagger \equiv \hat{S}_-/\sqrt{S_z}$ can be interpreted as the creation operator of a collective mode with $[\hat{b},\hat{b}^\dagger] \cong 1$. The creation operator can generate coherent superposition states in the spin ensemble. For example, from a fully polarized spin state, the collective mode state excited by one cavity photon can be a quantized spin wave $\hat{b}|g\rangle_1|g\rangle_2 \ldots |g\rangle_N = \sqrt{1/N}\sum_{j=1}^N|g\rangle_1 \ldots |g\rangle_{j-1}|e\rangle_j|g\rangle_{j+1} \ldots |g\rangle_N$ which can act as a boson. In the masing state, both the photons and the spin collective modes, coherently coupled to each other, can have macroscopic amplitudes. With the excitation number of the coherent spin collective mode $n_S \equiv \langle \hat{b}^\dagger \hat{b} \rangle = \langle \hat{S}_+ \hat{S}_- \rangle / S_z \sim O(N)$, the spins can be in a macroscopic quantum superposition state maintained by the masing process.

Figure 2B:
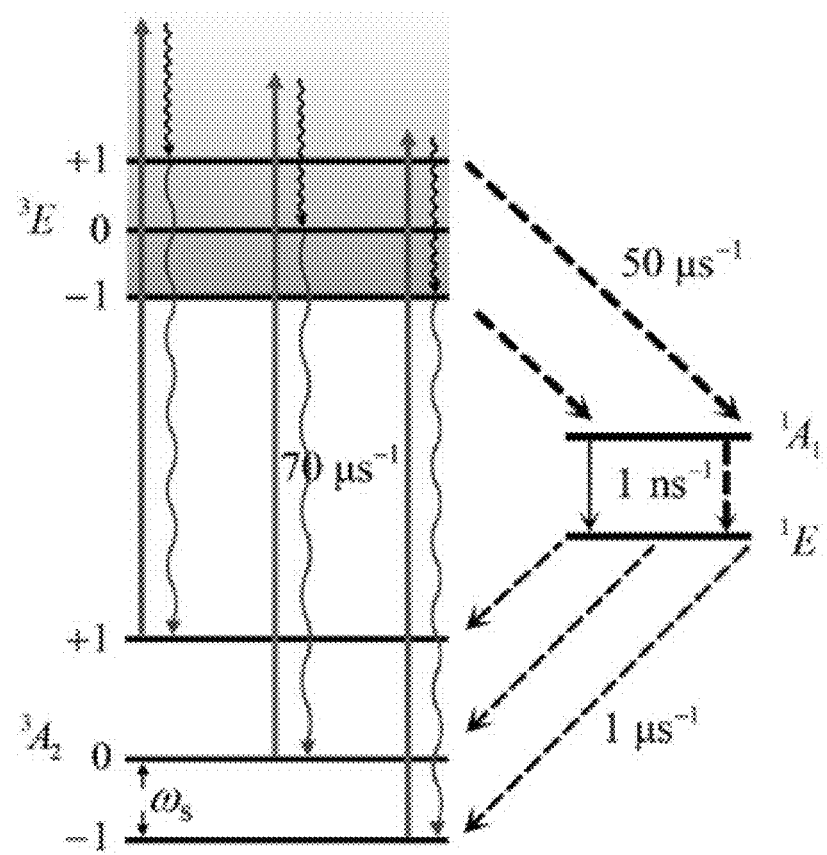
FIG. 2B shows a pumping scheme according to an embodiment of the subject invention. For example, after the optical excitation by light, the excited state $^3E$ can directly return to the ground state $^3A_2$ via spin-conserving photon emission at a rate ~70 $\mu s^{-1}$, but the excited states $|m_s=\pm 1\rangle$ can also decay to the singlet state $^1A_1$ via intersystem crossing at a rate of about 50 $\mu s^{-1}$ and quickly decay to the metastable state $^1E$, then relax back to the three different ground states at a rate of about 1 $\mu s^{-1}$ in each pathway.
Figure 3:
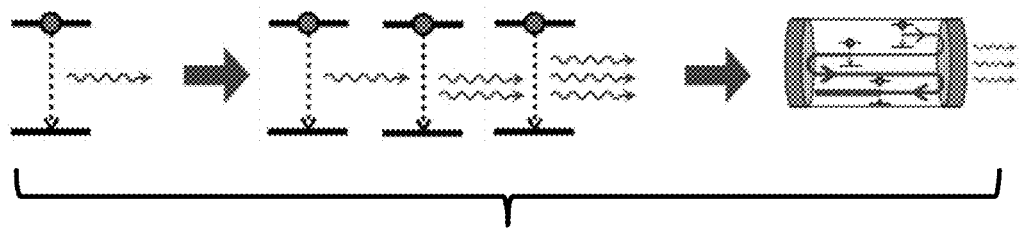
FIG. 3 shows a schematic representation of masing conditions, including coherence between photons.

A prerequisite of masing is to invert the spin population (see, e.g., FIG. 2B). The optical pumping rate w can be tuned by varying the pump light intensity, up to about $10^6$ s$^{-1}$. The cavity mode can have a decay rate determined by the cavity Q factor, $\kappa_c = \omega_c/Q$, due to photon leakage and coupling to input/output channels. The decay of the spin collective mode can be caused by various mechanisms. First, the spin relaxation ($T_1$ process caused by phonon scattering and resonant interaction between spins) can contribute a decay rate $\gamma_{eg} = 1/T_1$. Second, the individual spins can experience local field fluctuations due to interaction with nuclear spins, coupling to other NV and nitrogen (P1) center electron spins, and fluctuation of the zero-field splitting. Such local field fluctuations can induce random phases to individual spins, making the bright collective mode decay to other modes at a rate of $2/T^*_2$, where $T^*_2$ is the dephasing time of the spin ensemble. The optical pump of NV centers, being incoherent, can also induce decay of the collective mode. The collective mode decay rate induced by the incoherent pump is qw ($q \approx 16$, is a weighted factor that pump rate w enters the collective mode decay rate $\kappa_S$), which is larger than the spin pump rate w due to multiple excitation and relaxation pathways (see also FIG. 2C). The total decay rate of the collective mode can thus be $\kappa_S = qw + 2/T^*_2 + \gamma_{eg}$. The quantum dynamics of the coupled collective modes and the photons can be described by the quantum Langevin equations (equation set (1) above) for the photon and spin collective mode operators $\hat{a}$ and $\hat{S}_\pm$, the spin $\hat{N}_{e/g} \equiv \Sigma_{j=1}^{N_1} |e/g\rangle_{j j}\langle e/g|$, and $\hat{S}_z$.

The quantum Langevin equations can be solved at steady-state masing. When masing occurs, the quantum operators can be approximated as their expectation values, i.e., $\hat{S}_\pm \approx S_\pm$, $\hat{a} \approx a$, $\hat{N}_{e/g} \approx N_{e/g}$, and $\hat{S}_z \approx S_z$. By dropping the small quantum fluctuations, the quantum Langevin equations can be reduced to classical equations for the expectation values. Under the resonant condition ($\omega_c = \omega_S$), the steady-state solution is:

$$S_z = \kappa_S \kappa_c / (4g^2), \quad (7)$$

$$S_- = i\sqrt{S_z\left(\frac{w - \gamma_{eg}}{2\kappa_S} N - \frac{w + \gamma_{eg}}{2\kappa_S} S_z\right)},$$

$$a = \sqrt{\frac{w - \gamma_{eg}}{2\kappa_c} N - \frac{w + \gamma_{eg}}{2\kappa_c} S_z}.$$

When the population inversion $S_z \sim O(N)$, the $S_+ S_- \sim O(N^2)$. From equation set (7), the number of intra-cavity photons $|a|^2 = (4g^2/\kappa_c^2) S_+ S_- \propto N^2$ and consequently the output power $P_{out} = \hbar \omega_c \cdot \kappa_c |a|^2 \propto N^2$, both scaling with the number of spins by $N^2$, which signifies the super-radiant nature of the maser. To have a macroscopic number of spins inverted, i.e., $S_z \sim O(N)$, the following must be satisfied; $\kappa_S \propto N$; hence, the pump rate $w \propto N$ (because $\kappa_S \approx qw$ at well above the threshold). The photon number $|a|^2 > 0$ leads to the masing condition $$\kappa_c < \frac{4g^2}{\kappa_S} \frac{w - \gamma_{eg}}{w + \gamma_{eg}} N. \quad (8)$$

The pump rate should be greater than the spin relaxation rate for a population inversion ($w > \gamma_{eg}$). Also, the cavity Q factor has to be above a threshold $[Q_C \approx \omega_c \kappa_S/(4Ng^2)]$ to have a sufficient number of photons for sustaining the macroscopic quantum coherence. The cavity Q factor can be as follows:

$$Q_C = \frac{\kappa_S \omega_c}{4Ng^2} \frac{w + \gamma_{eg}}{w - \gamma_{eg}}. \quad (9)$$

Stronger spin-photon coupling (g), smaller spin collective mode decay rate ($\kappa_S$), or a larger number (N) of spins can reduce this threshold of the cavity Q factor. The cavity Q factor threshold is equivalent to the requirement that the spin collective mode decay rate $\kappa_S$ should be kept below the maximal collective emission rate of photons $4Ng^2/\kappa_c$. Otherwise, over-pumping can fully polarize the spins, making the spin-spin correlation vanish ($S_z \to N$ and $S_- \to 0$).

The threshold pump rate for population inversion is $w = \gamma_{eg} = 200$ s$^{-1}$, below this threshold, the emitted photons are absorbed. Above this threshold, the population is inverted and there is net photons emission into the cavity. The maser will amplify the resonant input signal (FIG. 11A, FIG. 11B, and FIG. 15B).

The threshold pump rate for masing is when pump overcomes the cavity loss, which is obtained from the masing condition equation (8). Note that the total decay rate of collective NV centres spin mode is $\kappa_S = qw + \gamma_{eg} + 2/T^*_2 \approx 2/T^*_2$ at low pump rate $w \sim \gamma_{eg}$. Thus, the threshold pump rate for masing is approximately $$w_{th} \approx \gamma_{eg} \frac{1 + \kappa_c/(2T^*_2 g^2 N)}{1 - \kappa_c/(2T^*_2 g^2 N)},$$

depending on the cavity decay rate.

Figure 11A:
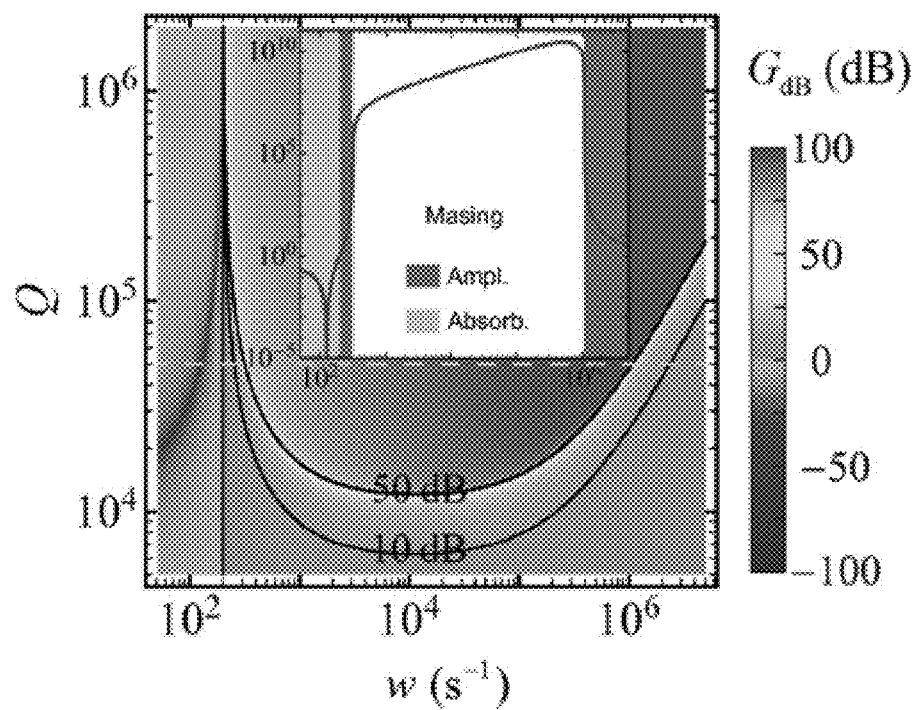
FIG. 11A shows a plot of power gain as functions of pump rate and cavity Q factor for a system according to an embodiment of the subject invention. The inset shows dependence on pump rate for a fixed $Q=5\times 10^4$ for resonant input microwave power $P_{in}=1$ femtoWatt (fW). The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 11B:
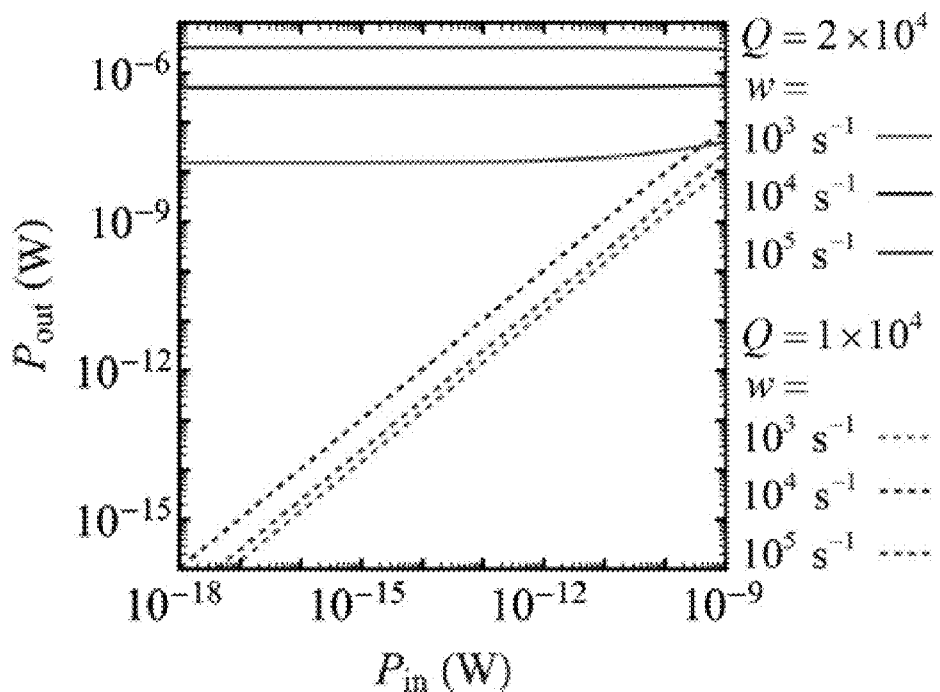
FIG. 11B shows a plot of output power as a function of resonant input microwave power, with a cavity Q factor of $1\times 10^4$ and $2\times 10^4$ for amplifying and masing, respectively. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 11C:
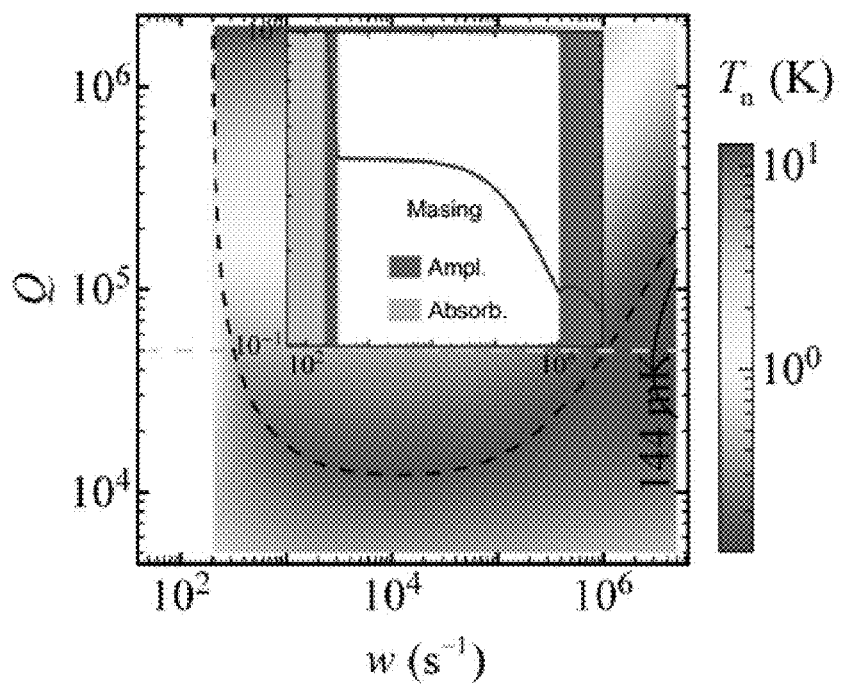
FIG. 11C shows a plot of noise temperature as functions of pump rate and cavity Q factor for a system according to an embodiment of the subject invention. The inset shows dependence on pump rate for a fixed $Q=5\times 10^4$ for resonant input microwave power $P_{in}=1$ fW. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 11D:
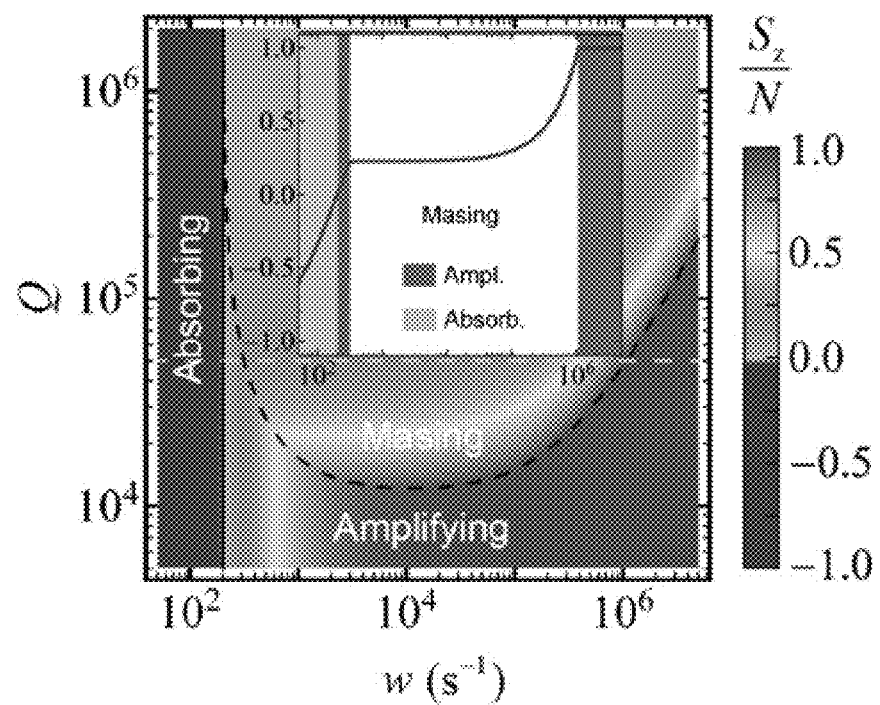
FIG. 11D shows a plot of spin inversion as functions of pump rate and cavity Q factor for a system according to an embodiment of the subject invention. The inset shows dependence on pump rate for a fixed $Q=5\times 10^4$ for resonant input microwave power $P_{in}=1$ fW. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figures 15A, 15B, 15C:
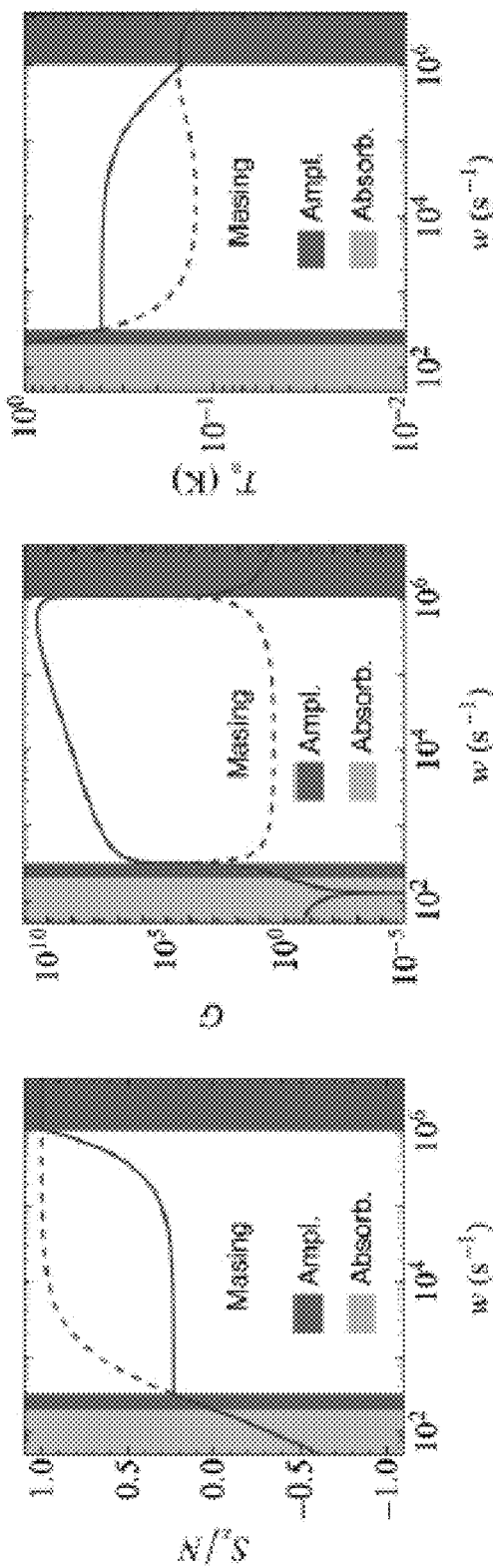
FIG. 15A shows a plot of spin polarization as a function of pump rate for a system according to an embodiment of the subject invention with a resonant input signal of 1 fW and a fixed cavity Q factor of $5\times10^4$. The absorbing (for $w<\gamma_{eg}=200$ s$^{-1}$), amplifying (for 200 s$^{-1}<w<316$ s$^{-1}$ $w>1.07\times10^6$ s$^{-1}$), and masing regions (for 316 s$^{-1}<w<1.07\times10^6$ s$^{-1}$) are marked as gray, green, and white, respectively (from left to right, the regions are gray, green, white, and green again). The solid lines are stable (masing) solutions and the dashed lines are the unstable (microwave amplifying) solutions in the masing region. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
FIG. 15B shows a plot of power gain as a function of pump rate for a system according to an embodiment of the subject invention with a resonant input signal of 1 fW and a fixed cavity Q factor of $5\times10^4$. The absorbing, amplifying, and masing regions are defined and marked as in FIG. 15A (from left to right, the regions are gray, green, white, and green again). The solid and dashed lines have the same representations as in FIG. 15A, and the parameters are also the same as those for FIG. 15A.
FIG. 15C shows a plot of noise temperature as a function of pump rate for a system according to an embodiment of the subject invention with a resonant input signal of 1 fW and a fixed cavity Q factor of $5\times10^4$. The absorbing, amplifying, and masing regions are defined and marked as in FIG. 15A (from left to right, the regions are gray, green, white, and green again). The solid and dashed lines have the same representations as in FIG. 15A, and the parameters are also the same as those for FIG. 15A.

Furthermore, there exists an over-pump threshold for masing ($w_{max}$) at very large pump rate (FIG. 11A, FIG. 11B, and FIG. 15B). Above this threshold, the cavity field builds spin-spin correlation slower than the pump destroys it, thus masing will shut down. Note that the total decay rate of collective NV centres spin mode is $\kappa_S = qw + \gamma_{eg} + 2/T^*_2 \approx qw + 2/T^*_2$ at high pump rate $w \gg \gamma_{eg}$. From the masing condition equation (8), the over-pump threshold for masing is approximately $w_{max} \approx (4g^2 N/\kappa_c - 2/T^*_2)/q$, depending on the cavity decay rate. Equivalently, masing shuts down when the spin collective mode decay rate $\kappa_S$ reaches the maximal collective emission rate of photons $4Ng^2/\kappa_c$, for the pump would fully polarize the spins, making the spin-spin correlation vanish.

The masing threshold sets a restriction on the cavity Q factor, i.e., $Q > \omega_c \kappa_S/(4Ng^2)$ or equivalently $\kappa_c < 4g^2 N/\kappa_S$. Although a larger number of NV centres N can reduce the threshold cavity Q factor, increasing the NV centre density and hence the P1 centre density would reduce the spin dephasing time $T^*_2$ (which is inversely proportional to the P1 centre density, $\rho_{P1} T^*_2 \approx 8.8 \times 10^{17}$ m$^{-3}$ s). Taking the NV centre spin relaxation rate $\kappa_S > 2/T^*_2$, we have $N/\kappa_S < \rho_{NV} V_{NV} T^*_2/24$. Substituting the spin-photon coupling g and $N/\kappa_S$ into the masing threshold inequality, we get $Q \cdot (V_{NV}/V_{eff}) \cdot (\gamma_{NV}^2 \mu_0 \hbar/12) \cdot (\rho_{NV} T^*_2) > 1$. Assuming a 10% N-to-NV conversion efficiency, we obtain $Q > Q_C$ with threshold cavity Q factor $$Q_C \approx 30 V_{eff}/V_{NV}. \quad (1)$$

Increasing the filling factor $V_{NV}/V_{eff}$ will reduce the threshold cavity Q factor. For a 4.5 mm$^3$ diamond and $V_{eff}$ confined below 15 cm$^3$, the threshold cavity Q factor is below $10^5$. Moreover, using larger size diamond can also reduce the threshold cavity Q factor but requires higher pump power.

Figure 7:
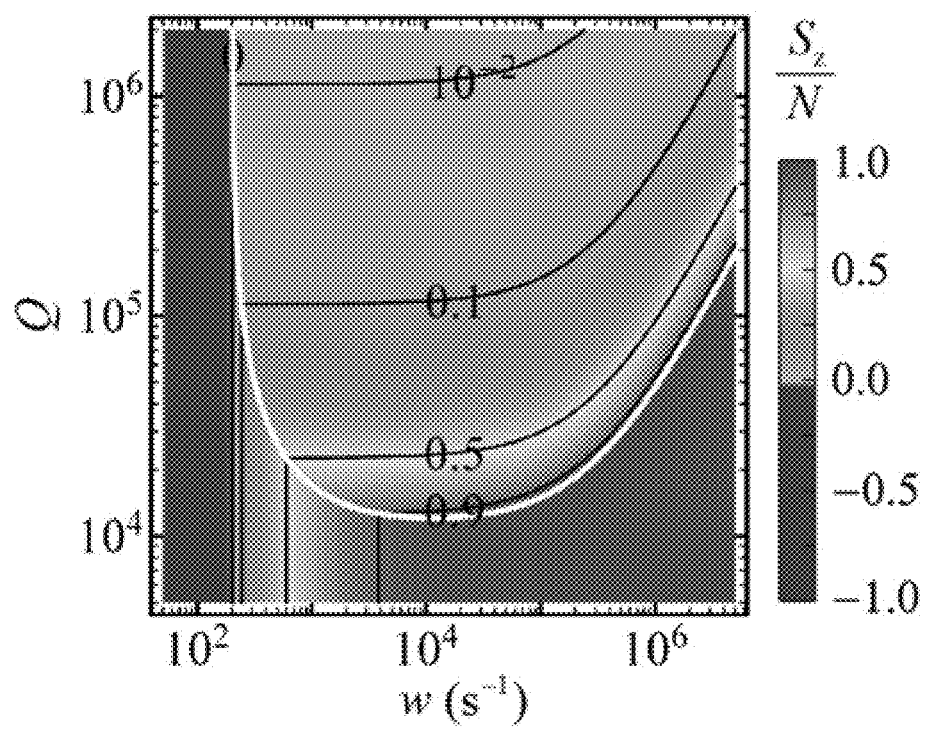
FIG. 7 shows a plot of spin polarization as functions of pump rate and cavity Q factor for a system according to an embodiment of the subject invention. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 8:
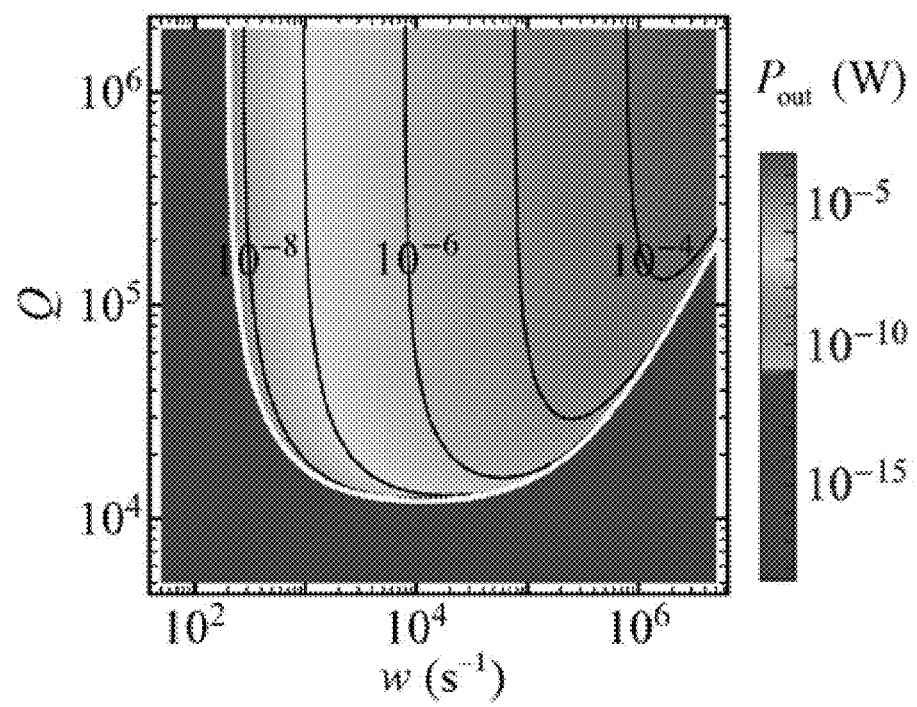
FIG. 8 shows a plot of microwave output power as functions of pump rate and cavity Q factor for a system according to an embodiment of the subject invention. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 9:
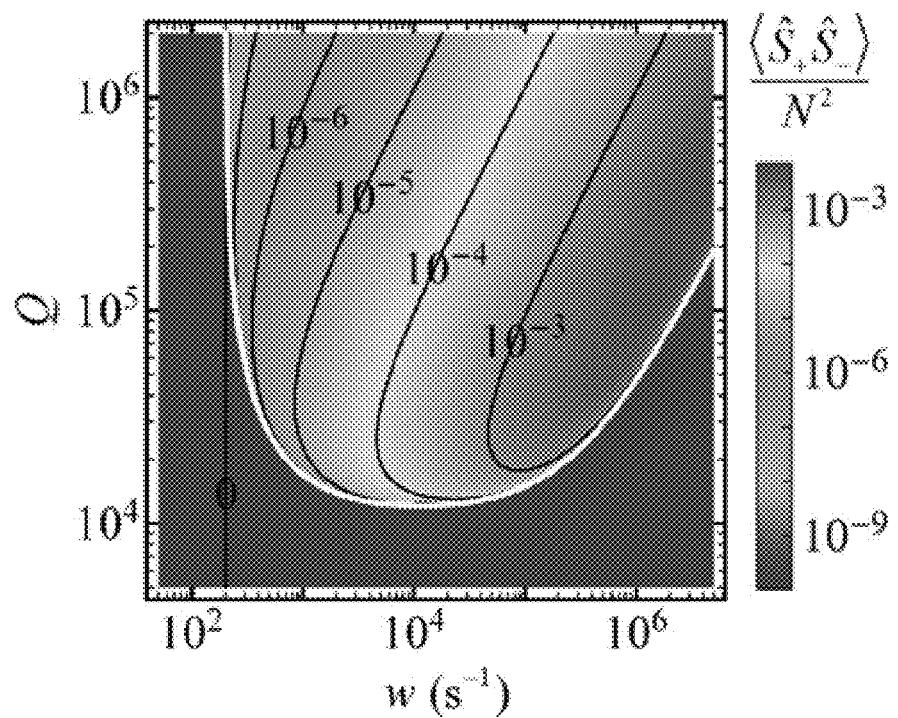
FIG. 9 shows a plot of spin-spin correlation as functions of pump rate and cavity Q factor for a system according to an embodiment of the subject invention. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.

Emergence of macroscopic quantum coherence is evidenced by macroscopic values of the spin-spin correlation, the photon number, and the spin collective mode amplitude under the masing condition. These values can be calculated by using the higher order equations of the correlation functions, which apply to both maser and incoherent emission. The spin polarization $S_z$, the microwave output power $P_{out} = \hbar\omega_c \cdot \kappa_c \langle \hat{a}^\dagger \hat{a} \rangle$ and the spin-spin correlation $\langle \hat{S}_+ \hat{S}_- \rangle$, shown in FIGS. 7-9, are consistent with results obtained from equation (7) when the pump rate and the cavity Q factor are above the masing threshold (white curve in FIGS. 7-9). Referring to FIG. 8, the output power increases dramatically when the pump rate is above the spin relaxation rate (population inverted) and the cavity Q factor is above the masing threshold. Referring to FIG. 9, the fact that $\langle \hat{S}_+ \hat{S}_- \rangle \gg N_e$ shows phase correlation among the large spin ensemble established by cavity photons in the masing region. The optimal pump condition for spin-spin correlation is determined by maximizing:

$$\langle \hat{S}_+ \hat{S}_- \rangle = S_z \left( \frac{w - \gamma_{eg}}{2\kappa_S} N - \frac{w + \gamma_{eg}}{2\kappa_S} S_z \right). \quad (10)$$

With the assumption $w \gg \gamma_{eg}, 1/(qT^*_2)$, the spin-spin correlation reaches its maximum value $\langle \hat{S}_+ \hat{S}_- \rangle \approx N^2/(8q)$ at the optimal pump rate $w_{opt}^{max-corr} \approx 2Ng^2/(q\kappa_c)$, where the spin polarization is $S_z \approx N/2$ and the maser power is $P_{out} \approx \hbar\omega_c \cdot N^2 g^2/(2q\kappa_c)$.

Figure 10:
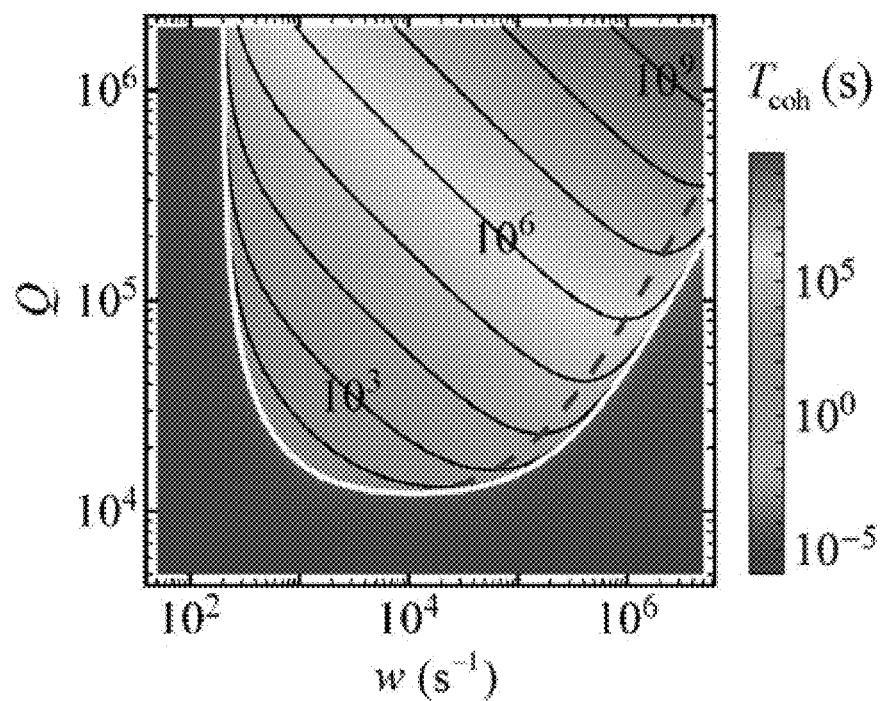
FIG. 10 shows a plot of macroscopic quantum coherence time as functions of pump rate and cavity Q factor for a system according to an embodiment of the subject invention. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.

The maser linewidth can be determined by the correlation of the phase fluctuations of photons or equivalently that of the spin collective modes. The coherence time can be obtained as:

$$T_{coh} = 4(\kappa_c^{-1} + \kappa_S^{-1})(n_c + n_S)/n_{incoh}, \quad (11)$$

where $n_c = \langle \hat{a}^\dagger \hat{a} \rangle$ is the photon number, $n_S = \langle \hat{S}_+ \hat{S}_- \rangle / S_z$ is the spin collective mode number, and $n_{incoh} = n_{th} + N_e/S_z$ includes the thermal photon number ($n_{th}$) and the incoherent spin collective mode number ($\langle \hat{S}_+ \hat{S}_- \rangle / S_z = \Sigma_{j=1}^N \langle \hat{s}_j^+ \hat{s}_j^- \rangle / S_z = N_e/S_z$ if the correlation between different spins is forced to be zero). The physical meaning of equation (11) is the following: the coherent excitations (photons and spin collective excitations) have the same phase within the total lifetime ($\kappa_c^{-1} + \kappa_S^{-1}$) of the photons and the spin collective modes; beyond the total lifetime, each incoherent excitation induces a random phase $\sim O(\pi)$, and the total random phase is shared by all the coherent excitations. Thus, the random phase of a single photon or spin collective excitation accumulated during the total lifetime $\kappa_c^{-1} + \kappa_S^{-1}$ is $\sim O[n_{incoh}\pi/n_c + n_S)]$. The coherence time can be greatly enhanced under the masing conditions, as seen in FIG. 10. For NV centers, the spin collective mode decay rate $\kappa_S > 10^6$ s$^{-1}$, while for a good microwave cavity (Q>10$^5$), the photon decay rate $\kappa_c < 6\pi \times 10^4$ s$^{-1}$. Thus, the photon number $n_c = n_S \kappa_S/\kappa_c$ is much greater than the spin collective mode number, and the macroscopic quantum coherence is mainly maintained by the photons in the cavity. Fractional frequency fluctuation of room-temperature diamond masers can be around $\sim 10^{-13} \tau^{-1/2}$ to $\sim 10^{-12} \tau^{-1/2}$, as listed in Tables 1 and 2 for a cavity having $Q = 5 \times 10^4$. For comparison, fractional frequency fluctuation of a hydrogen maser is $\sim 10^{-13} \tau^{-1/2}$ at room temperature or $\sim 10^{-15} \tau^{-1/2}$ at cryogenic temperature, and the state-of-the-art ytterbium atomic clock has a frequency fluctuation of $\sim 10^{-16} \tau^{-1/2}$. The optimal pump condition for long coherence time can be obtained from equation (11). In the good-cavity or large ensemble limit where $2Ng^2/\kappa_c \gg 1/T^*_2$ and at room temperature where $n_{incoh} \approx n_{th}$, the optimal pump rate for maximum coherence time is close to that for maximum spin-spin correlation, i.e., $w_{opt}^{max-corr} \approx 2Ng^2/(q\kappa_c)$, and the optimal coherence time reaches the following:

$$T_{coh}^{opt} \approx 2N^2 g^2/(qn_{th}\kappa_c^3). \quad (12)$$

The maximum coherence time can scale with the spin number and the cavity Q factor according to $T_{coh}^{opt} \propto N^2 Q^3$. The quantum coherence sustained by active masing (with pump) can have a much longer lifetime than the spin coherence protected by passive coupling to the cavity (without pump). This is due to the super-radiant emission of photons from the spin collective modes of the NV centers in the bulk diamond and the concomitant large number of photons in the cavity.

In certain embodiments, a coupled spin-cavity system can be configured as a microwave amplifier when the spin population is inverted ($S_z > 0$) but the cavity Q factor is below the masing threshold ($Q < Q_C$). As a room-temperature microwave amplifier, the noise temperature can be as low as $\sim 0.2$ K (compared to $\sim 1$ K for a state-of-the-art ruby amplifier working at liquid-helium temperature). The spin inversion, the power gain, the microwave output power, and the noise temperature can be calculated with a weak microwave resonant input. Referring to FIGS. 11A-11D, the system can linearly amplify the microwave signal for readily accessible parameters $Q = 10^4$.

The ultra-long coherence time of masers of the subject invention is useful for metrology. The collective excitation of a large number of spins ($\sim 10^{14}$) and cavity photons can enhance sensitivity. The sensitivity to a slow-varying magnetic field noise (with frequency $\leq \kappa_S/2$) can be estimated to be $\delta B \sqrt{\tau} = \gamma_{NV}^{-1}(1 + \kappa_S/\kappa_c)\sqrt{2T_{coh}^{-1}}$ for measurement time $\tau$, where $\gamma_{NV}/2\pi = 2.8$ MHz/Gauss is the NV center gyromagnetic ratio. In Tables 1 and 2, the magnetic field sensitivity is on the order of 10 pT·Hz$^{-1/2}$ to 1 pT·Hz$^{-1/2}$ at room temperature. The temperature fluctuation would induce cavity frequency fluctuation via thermal expansion and dielectric constant variation. The temperature sensitivity $\delta T \sqrt{\tau} = g_0^{-1}(1 + \kappa_c/\kappa_S)\sqrt{2T_{coh}^{-1}}$, is on order of 100 nK·Hz$^{-1/2}$ to 10 nK·Hz$^{-1/2}$ at room temperature, where $g_0 \approx (\alpha + \beta/2)\omega_c$ with $\alpha$, $\beta$ being the temperature coefficients of thermal expansion and permittivity for sapphire. For higher cavity Q factor, the thermometry sensitivity is enhanced while the magnetometry sensitivity is reduced (see FIGS. 12 and 13) due to the frequency dragging effect. The steady-state masing frequency can be a weighted average of the spin and cavity frequency, $\omega = (\kappa_c \omega_s + \kappa_S \omega_c)/(\kappa_c + \kappa_S)$. The sensitivities to the magnetic field and the temperature noises set the requirements on stability of the setup for maintaining the long coherence time of the maser.

The pump power $P_{pump} = \hbar\omega_{p1}(S/\sigma)(4w)$ is proportional to the pump light frequency ($\omega_n$), the pump rate (w), and the area of the pump light spot (5) divided by the NV center absorption cross section ($\sigma$). The threshold pump power is low because the spin relaxation time is long in diamond. Tables 1 and 2 show diamond maser performance with cavity Q factor $Q = 5 \times 10^4$ for readily accessible cavities. The threshold pump power for microwave amplifying (population inversion) can be estimated to be 2.7 W, above which net photons can emit into the cavity, thus amplifying signal. The threshold pump power for masing can be estimated to be 4.3 W for a cavity with Q=5×10$^4$, above which NV centers spin can show strong collective behavior, and the emitted photons number scales as emitter number square $n_c \propto N^2$.

With a small internal cavity loss, all the cavity decay can be considered to be caused by the input-output loss ($\kappa_c^{vac}/\kappa_c \to 0$, $\kappa_c = \kappa_c^{ex} + \kappa_c^{vac}$ is the total cavity photon decay includes the internal loss $\kappa_c^{vac}$ the input-output loss $\kappa_c^{ex}$). At steady-state, the output power can be about $P_{out} \approx \hbar \omega_c \cdot \kappa_c n_c$, where $n_c$ is the intracavity photons number. When masing occurs, the output power can be expressed as $$P_{out} = \hbar \omega_c \left( \frac{w - \gamma_{eg}}{2} N - \frac{w + \gamma_{eg}}{2} \frac{\kappa_c \kappa_S}{4g^2} \right). \quad (13)$$

The maser linewidth can be limited by the Schawlow-Townes linewidth determined by the quantum fluctuations, $$\Delta \nu_{ST} = \frac{1}{4\pi} \frac{\kappa_S \kappa_c}{\kappa_S + \kappa_c} \frac{n_{incoh}}{n_c + n_S}, \quad (14)$$

where $n_s$ is the magnon number, $n_{incoh} = n_{th} + N_e/S_z$ is the incoherent excitation that includes the thermal photon number ($n_{th}$) and the incoherent magnon number $N_e/S_z$. At steady-state, the stimulated emission photon number can be equal to the relaxed magnon number in unit time, $n_c \kappa_c = n_S \kappa_S$. The coherence time of the microwave field can be determined by the maser linewidth $T_{coh} = (\pi \cdot \Delta \nu_{ST})^{-1}$.

The NV center spins can have good coherence properties at least up to 600 K. Also, the spin polarization, the pump rates, and the T*$_2$ decoherence time can be only slightly changed at temperatures as high as 650 K. The longitudinal spin relaxation time $T_1$ can be reduced to 0.34 ms at 600 K, more than 10 times shorter than at room temperature, and the pump threshold for microwave amplifying (w=1/T$_1$) can be fulfilled when the pump power is greater than 40 W (14)>1/T$_1$=2,941 s$^{-1}$). Also, the contribution of the longitudinal spin relaxation to spin collective mode decay can be negligible (1/T$_1$<<qw, 1/T*$_2$).

The temperature fluctuation can also lead to transition frequency shifts of the spins (via lattice expansion) and the cavity mode (via dielectric constant variation and mode volume expansion), with $(2\pi)^{-1} \delta \omega_s / \delta T \sim -74$ kHz K$^{-3}$ and $(2\pi)^{-1} \delta \omega_c / \delta T \sim -165$ kHz K$^{-1}$. Some masing conditions can correspond to photon leakage rate being much slower than the decay rate of the spin collective mode ($\kappa_e << \kappa_S$). In such cases (as with the many of the values discussed herein), the effect of temperature fluctuation on the maser linewidth can result mainly from the cavity mode frequency fluctuation. In Tables 1 and 2, maser performance is shown under 0.5 K temperature fluctuations for a cavity with a Q factor Q=5×10$^4$. FIGS. 14A-14D show the population inversion, the output power, the maser linewidth, and coherence time, respectively, as functions of the temperature fluctuation for a cavity having Q=5×10$^4$, and typical pump rate w=10$^3$, 10$^4$, and 10$^5$ s$^{-1}$. The threshold cavity Q factor is the lowest near w=10$^4$ s$^{-1}$ (see also FIGS. 7-13); thus, pump rate near w=10$^4$ s$^{-1}$ can be considered as robust to temperature fluctuation. The masing condition can still be fulfilled for up to 1.0 K temperature fluctuation at w=10$^4$ s$^{-1}$. However, temperature

TABLE 1

Performance of room-temperature diamond maser under low pump

| $P_{pump}$ (W) | w (s$^{-1}$) | $P_{out}$ (nW) | $T_{coh}$ (s) | $\Delta \nu_{ST}$ (mHz) | $\delta B \sqrt{\tau}$ (pT Hz$^{-1/2}$) | $\delta T \sqrt{\tau}$ (nK Hz$^{-1/2}$) | $\sigma_y(\tau)\sqrt{\tau}$ (10$^{-12}$) |
|---|---|---|---|---|---|---|---|
| 6.0 | 440.1 | 12.5 | 98 | 3.2 | 11.6 | 148.2 | 8.1 |
| (1.0) | (440.1) | (1.3) | (7) | (46.5) | (29.5) | (582.0) | (32.0) |
| 8.0 | 586.9 | 27.4 | 215 | 1.5 | 7.8 | 100.1 | 5.5 |
| (1.4) | (586.9) | (9.3) | (51) | (6.3) | (10.8) | (213.8) | (11.8) |
| 10.0 | 733.6 | 42.2 | 332 | 1.0 | 6.3 | 80.6 | 4.4 |
| (1.7) | (733.6) | (17.3) | (95) | (3.4) | (7.9) | (156.6) | (8.6) |

TABLE 2

Performance of room-temperature diamond maser under high pump.

| $P_{pump}$ (W) | w (s$^{-1}$) | $P_{out}$ (µW) | $T_{coh}$ (s) | $\Delta \nu_{ST}$ (µHz) | $\delta B \sqrt{\tau}$ (pT Hz$^{-1/2}$) | $\delta T \sqrt{\tau}$ (nK Hz$^{-1/2}$) | $\sigma_y(\tau)\sqrt{\tau}$ (10$^{-12}$) |
|---|---|---|---|---|---|---|---|
| 13.6 | 10$^3$ | 0.07 | 543 | 585.8 | 4.9 | 62.9 | 3.5 |
| (2.4) | (10$^3$) | (0.008) | (33) | (9,768.8) | (9.4) | (281.3) | (15.5) |
| 136.3 | 10$^4$ | 1.0 | 7,609 | 41.8 | 1.4 | 16.8 | 0.9 |
| (23.7) | (10$^4$) | (0.2) | (892) | (357.0) | (1.8) | (53.6) | (2.9) |
| 1,363.2 | 10$^5$ | 9.2 | 69,580 | 4.6 | 0.6 | 5.5 | 0.3 |
| (236.7) | (10$^5$) | (1.6) | (5,776) | (55.1) | (0.9) | (20.4) | (1.1) |

An optical pump can heat the system, inducing both temperature increase and fluctuation (e.g., by providing radiation 150, such as visible light; see FIG. 1). The frequency shifts of the spins and the cavity due to temperature increase is not an issue because once steady-state is reached, the spin transition frequency can be tuned to resonance with the cavity mode by tuning the magnetic field.

fluctuation can reduce the masing performance (Tables 1 and 2). For a larger number of spins, a larger temperature fluctuation can be tolerated ($\Delta T_{max} \propto N$) due to the reduced threshold cavity Q factor.

Table 3 shows the performance of a diamond microwave amplifier according to an embodiment of the subject invention. The power input was 1 fW resonant input. The numbers in brackets in the second and third rows show the amplifier gain and noise temperature. The numbers in brackets in the first row show the NV centers absorbed power ($P_{absorb}$). The numbers in the brackets in the second and third rows were calculated with the temperature fluctuation of 0.2 K or 0.5 K taken into account for the pump power of below or above 10 W, respectively.

The maser system can operate as an amplifier when the spin population is inverted ($w > \gamma_{eg}$) but the cavity Q factor is below the masing threshold ($Q < Qc$). Operating as microwave amplifier, the power gain G (output power divided by input power) can be around unity for non-resonant input. Table 3 shows gain values for other inputs. For example, with a resonant weak input signal of 1 fW at cavity $Q=10^4$, the power gain can be about 6 dB to 10 dB under 6 W to 10 W pump power, and the corresponding noise temperature $T_n$ can be about 340 mK to 280 mK. At high pump around 136 W, the gain can be, for example, as high as 20 dB with a noise temperature as low as 200 mK. The single-photon noise temperature can be, for example, 144 mK, and thus the diamond amplifier noise temperature can be at the single-photon level.

TABLE 3

Performance of diamond microwave amplifier for 1 fW resonant input.

| $P_{pump}$ (W) | 6.0 | 8.0 | 10.0 | 13.6 | 136.3 | 1,363.2 |
|---|---|---|---|---|---|---|
| | (1.0) | (1.4) | (1.7) | (2.4) | (23.7) | (236.7) |
| G (dB) | 6.0 | 8.1 | 9.6 | 11.7 | 20.3 | 14.0 |
| | (3.8) | (5.7) | (7.1) | (5.1) | (9.8) | (6.7) |
| $T_n$ (mK) | 339 | 303 | 281 | 258 | 201 | 216 |
| | (347) | (321) | (302) | (320) | (263) | (283) |

For NV center concentration, a single crystal bulk diamond sample can be considered, and the sample can be the same as or similar to that used in Grezes et al. (Phys. Rev. X 4, 021049, 2014), which is incorporated herein by reference in its entirety. The size of the diamond can be, for example, such that $V_{NV} = 3 \times 3 \times 0.5$ mm$^3$. The P1 center (single substitutional nitrogen center) concentration can be, for example, about 20 ppm (1 ppm=$1.76 \times 10^{17}$ cm$^{-3}$), and the NV center concentration can be about 2 ppm (corresponding to a 10% N-to-NV conversion efficiency). A conversion efficiency of, for example, up to 30% can be achieved. The number of NV center spins resonantly coupled to the cavity photons (N) can be estimated as follows. Considering four orientations of the NV centers and the hyperfine interaction with the nitrogen nuclear spin (which can split the transition into three resonances, with only one resonant with the cavity mode), the number of NV centers effectively interacting with the cavity mode can be estimated to be $N = \rho_{NV} V_{NV}/12 = 1.32 \times 10^{14}$. For diamond fabricated with preferential alignment of NV centers in single-crystalline, the number of coupled NV centers can be $N = \rho_{NV} V_{NV}/3$, and there can be four times more NV centers coupled to the cavity mode, which would lead to a four-time reduction on the threshold cavity Q factor required for masing (QC is inversely proportional to N).

The dephasing of an ensemble of NV center spins can be mainly caused by dipolar interaction with the P1 center electron spins, the hyperfine interaction with $^{13}$C nuclear spins, and the zero-field splitting (ZFS) fluctuations. The dipolar interaction with the P1 center electron spins can contribute a dephasing rate of about $10^6$ s$^{-1}$ for the P1 concentration, interaction with the $^{13}$C nuclear spins of natural abundance (1.1%) can contributes about $10^6$ s$^{-1}$, and the ZFS fluctuation can induce a dephasing rate of about $10^6$ s$^{-1}$. Summing up these contributions, the total dephasing time can be estimated as T2*=0.4 is for the ensemble of NV centers. Also, the NV center spin-lattice relaxation can be temperature dependent. The parameter $\gamma_{eg} = 200$ s$^{-1}$ ($T_1 = 5$ ms) at room temperature T=300 K can be adopted.

A sapphire dielectric microwave resonator loaded in a coaxial cylindrical cavity, with a TE$_{01\delta}$ mode of frequency $\omega_c/2\pi = 3$ GHz can be considered. The sapphire, due to its low loss tangent ($10^{-5}$) at room temperature and large dielectric permittivity (the relative permittivity $\varepsilon_r \approx 10$), can be an ideal material for room-temperature microwave resonators with high-Q ($Q > 10^5$) and reduced mode volume. The prime TE$_{01\delta}$ mode in the resonator can have a transverse electric field and vertical magnetic field. The magnetic field can be azimuthally symmetric, and the magnetic loop on the side wall can couple to the magnetic field. The electric field can be quite strong in the equatorial plane of the resonator, except near the resonator center. Consequently, removing the central part of the resonator may not disturb the field or the resonant frequency. A tubular resonator with ¼ radius removed from the central can still behave similarly to a complete cylindrical dielectric resonator. The diamond sample can be placed in the center of the sapphire resonator, with the NV axis oriented along the external magnetic field, which can be applied perpendicular to the cavity axis. A mobile Halbach magnet array can provide a highly homogeneous 2,100 Gauss external magnetic field with inhomogeneity <0.01 Gauss across the diamond size (5 mm). A 532-nm pump light can be input from the cavity side wall. The specific parameters of a cavity with desired features can be chosen such that the sapphire crystal is, for example, 16 mm in height (h) and 15 mm in radius (r), and loaded in the center of a 40 mm height (H), 40 mm radius (R) coaxial cylindrical cavity, placed inside a Halbach magnet ring array with a 50 (80) mm inner (outer) radius. The exact resonant frequency of the TE$_{01\delta}$ mode in the cavity system, estimated from the parallel-plates model can satisfy $$\tan\left(\frac{h}{2}\sqrt{k_0^2 \varepsilon_s - \frac{x_{01}^2}{r^2}}\right) \tanh\left(\frac{H-h}{2}\sqrt{\frac{x_{01}^2}{r^2} - k_0^2}\right) = \sqrt{\frac{x_{01}^2/r^2 - k_0^2}{k_0^2 \varepsilon_r - x_{01}^2/r^2}}, \quad (15)$$

where $k_0 = \omega_c/c$ is the wave number in free space, and $x_{01} \approx 2.405$ is the first root of the Bessel function of the first kind, i.e., $J_0(x_{01}) = 0$.

The spin-photon coupling can be $$\frac{g}{2\pi} = \frac{\gamma_{NV}}{2\pi}\sqrt{\frac{\mu_0 \hbar \omega_c}{2 V_{eff}}},$$

where $V_{eff}$ is the effective cavity mode volume, and $\mu_0$ is the vacuum permeability, and $\hbar$ is the Planck constant. For a mode volume $V_{eff} \approx 3$ cm$^3$, the coupling can be $g/2\pi \approx 0.02$ Hz. Also, the temperature variation can lead to cavity mode frequency fluctuation via thermal expansion and dielectric constant variation. By equation (15), small variations in the dimensions of the dielectric resonator $r \to r+\Delta r$, $h \to h+\Delta h$ and in the permittivity $\varepsilon_r \to \varepsilon_r+\Delta \varepsilon_r$ can lead to a small frequency shift $\Delta \omega_c$ of the TE$_{01\delta}$ mode, which can be determined by $$A\frac{\Delta \omega_c}{\omega_c} + B\frac{\Delta r}{r} + C\frac{\Delta h}{h} + D\frac{\Delta \varepsilon_r}{\varepsilon_s} = 0, \text{ with} \tag{16}$$

$$A = \left(\frac{x_{01}}{r}\right)^2 \frac{k_0^2(\varepsilon_r - 1)}{\sqrt{\left(\frac{x_{01}}{r}\right)^2 - k_0^2}} + k_0^2 \varepsilon_r \frac{h}{2}\left[\frac{k_0^2 \varepsilon_r - \left(\frac{x_{01}}{r}\right)^2}{\coth\zeta} + \frac{\left(\frac{x_{01}}{r}\right)^2 - k_0^2}{\tanh\zeta}\right], \tag{17}$$

$$B = \left(\frac{x_{01}}{r}\right)^2 \left\{ \frac{k_0^2(\varepsilon_r - 1)}{\sqrt{\left(\frac{x_{01}}{r}\right)^2 - k_0^2}} + \right. \tag{18}$$

$$\left. \frac{h}{2}\left[\frac{k_0^2 \varepsilon_r - \left(\frac{x_{01}}{r}\right)^2}{\coth\zeta} + \frac{\left(\frac{x_{01}}{r}\right)^2 - k_0^2}{\tanh\zeta}\right] - \frac{(H-h)\left[k_0^2 \varepsilon_r - \left(\frac{x_{01}}{r}\right)^2\right]}{\sinh(2\zeta)} \right\}.$$

$$C = \left[k_0^2 \varepsilon_r - \left(\frac{x_{01}}{r}\right)^2\right] \tag{19}$$

$$\left\{ \frac{h}{2}\left[\frac{k_0^2 \varepsilon_r - \left(\frac{x_{01}}{r}\right)^2}{\coth\zeta} + \frac{\left(\frac{x_{01}}{r}\right)^2 - k_0^2}{\tanh\zeta}\right] - \frac{h\left[\left(\frac{x_{01}}{r}\right)^2 - k_0^2\right]}{\sinh(2\zeta)} \right\},$$

$$D = \frac{1}{2}k_0^2\varepsilon_r \left\{ \sqrt{\left(\frac{x_{01}}{r}\right)^2 - k_0^2} + \frac{h}{2}\left[\frac{k_0^2\varepsilon_r - \left(\frac{x_{01}}{r}\right)^2}{\coth\zeta} + \frac{\left(\frac{x_{01}}{r}\right)^2 - k_0^2}{\tanh\zeta}\right] \right\}, \tag{20}$$

where $\zeta = (H-h)\sqrt{(x_{01}/r)^2 - k_0^2}/2$. The sapphire can be an anisotropic material with properties such as hardness and thermal expansion that are different along different directions. For example, the thermal expansion coefficients of sapphire can be different in directions perpendicular and parallel to the c-axis ($\alpha_\perp = 5\times 10^{-6}$ K$^{-1}$ and $\alpha_\parallel = 6.6\times 10^{-6}$ K$^{-1}$), i.e., $\Delta r/r = \alpha_\perp \Delta T$, and $\Delta h/h = \alpha_\parallel \Delta T$.

The sapphire can be approximated as isotropic when considering the thermal expansion and dielectric constant variation, with the thermal expansion coefficient $\Delta r/r = \Delta h/h = \alpha \Delta T$ and the permittivity temperature coefficient $\Delta \varepsilon_r/\varepsilon_r = \beta \Delta T$. The mode frequency can depend on the temperature via $$\frac{\Delta \omega_c}{\omega_c} = -\left(\frac{B+C}{A}\alpha + \frac{D}{A}\beta\right)\Delta T,$$

the mode frequency fluctuation can be $$\Delta\omega_c \approx -(\alpha+\beta/2)\omega_c \Delta T, \tag{21}$$

where $\alpha = 5\times 10^{-6}$ K$^{-1}$, $\beta = 10^{-4}$ K$^{-1}$, and $(2\pi)^{-1}\Delta\omega_c/\Delta T$ is about 165 kHz K$^{-1}$. The temperature fluctuation can lead to additional cavity linewidth. Taking into account the cavity frequency fluctuation due to temperature instability, a reduced effective cavity Q factor Q* can be introduced via $\omega_c/Q^* = \omega_c Q + \Delta\omega_c$.

The zero-field splitting (D) of NV center spin can also be temperature dependent, with $\Delta D/\Delta T = -74$ kHz K$^{-1}$. Thus, the temperature fluctuation can also lead to extra broadening of the spin transition frequency $\Delta\omega_S/2\pi = (\Delta D/\Delta T)\cdot \Delta T$, which can adds to $2/T^*_2$.

The NV center electronic spins can be optically pumped into the $m_s=0$ ground state. A 532-nm green light can excite the NV center triplet ground state $^3A_2$ to vibronic excited states, which can decay to the triplet excited state $^3E$. The $m_s=0$ excited state can almost fully decay to the ground state via spin-conserving photon emission. However, the $m_s=\pm 1$ excited state can decay to the ground state either by spin-conserving photon emission or by spin non-conserving relaxation via the intersystem crossing (ISC), with similar rates. From the singlet state $^1A_1$, the spin can quickly decay to the metastable $^1E$ state at a rate of about 1 ns$^{-1}$, and can then relax back to the three ground states at roughly equal rates of about 1 μs$^{-1}$. Under continuous optical pumping, the $m_s=-1$ ground state ($|g\rangle$) can be pumped to the $m_s=0$ ground state ($|e\rangle$) with a success probability of about ¼ in each excitation event. Considering effective pump into $|e\rangle$ state at a rate w, the excitation rate can be about 4w. The photon emission processes to the $m_s=-1$ and $m_s=0$ ground states can have rates 2w and 4w, respectively. All these pump and decay processes can destroy the NV center spin ensemble coherence. Therefore, the decay of the spin collective mode due to the optical pump can have a rate of about 16w. The total spin collective mode decay rate, including the contributions from the optical pump, the spin dephasing, and the spin-lattice relaxation, can thus be obtained as $\kappa_S = qw + 2/T^*_2 + \gamma_{eg}$, with $q \approx 16$.

The absorption cross section of the NV center for 532-nm light can be $\sigma \approx 3.1\times 10^{17}$ cm$^2$. The pump power can be $P_{pump} = \hbar\omega_p(S/\sigma)(4w)$, where $\hbar\omega_p = 3.74\times 10^{-19}$ J is the 532-nm photon energy, a light spot of radius 3 mm with illuminating area $S = 9\pi$ mm$^2$ can fully cover the 3×3 mm$^2$ diamond sample. The absorbed power by the NV centers can be $\hbar\omega_p(12N)(4w)$ only about 17% of the pump power.

The threshold pump rate for population inversion can be $w = \gamma_{eg} = 200$ s$^{-1}$, and below this threshold, the emitted photons can be absorbed. Above this threshold, the population can be inverted and there can be net photon emission into the cavity. The maser can amplify the resonant input signal. The threshold pump power for population inversion (microwave amplifying) determined from $w = \gamma_{eg} = 200$ s$^{-1}$ can be estimated to be 2.7 W. The threshold pump rate for masing can be when the pump overcomes the cavity loss, which can be obtained from the masing condition (Equation (8)). The total decay rate of collective NV centers spin mode can be $\kappa_S = qw + \gamma_{eg} + 2/T^*_2 \approx 2/T^*_2$ at low pump rate $w \sim \gamma_{eg}$. Thus, the threshold pump rate for masing can be approximately $$w_{th} \approx \gamma_{eg} \frac{1 + \kappa_c/(2T^*_2 g^2 N)}{1 - \kappa_c/(2T^*_2 g^2 N)},$$

depending on the cavity decay rate. For a maser system with cavity Q factor $Q = 5\times 10^4$, the threshold pump rate for masing can be $w_{th} \approx 1.58\gamma_{eg} = 316$ s$^{-1}$, corresponding to a masing threshold pump power about 4.3 W. For a good quality cavity, $w_{th}$ can be close to but larger than $\gamma_{eg}$ (e.g., $\gamma_{eg} < w_{th} < 1.11\gamma_{eg}$ for $Q > 2\times 10^5$).

Further, there can exist an over-pump threshold for masing ($w_{max}$) at very large pump rate. Above this threshold, the cavity field can builds spin-spin correlation slower than the pump destroys it, and thus masing may shut down. The total decay rate of collective NV centers spin mode can be $\kappa_S = qw + \gamma_{eg} + 2/T^*_2 \approx qw + 2/T^*_2$ at a high pump rate $w \gg \gamma_{eg}$. From the masing condition (Equation (8)), the over-pump threshold for masing is approximately $w_{max} \approx (4g^2 N/\kappa_c - 2/T^*_2)/q$, depending on the cavity decay rate. Equivalently, masing can shut down when the spin collective mode decay rate $\kappa_S$ reaches the maximal collective emission rate of photons $4Ng^2/\kappa_c$, for the pump would fully polarize the spins, making the spin-spin correlation vanish.

The masing threshold can set a restriction on the cavity Q factor, i.e., $Q > \omega_c \kappa_S/(4Ng^2)$ or equivalently $\kappa_c < 4g^2 N/\kappa_S$. Although a larger number of NV centrsr N can reduce the threshold cavity Q factor, increasing the NV center density and hence the P1 center density would reduce the spin dephasing time (which is inversely proportional to the P1 centre density, $\rho_{P1} T^*_2 \approx 8.8 \times 10^{17}$ m$^{-3}$ s). Taking the NV centre spin relaxation rate $\kappa_S < 2/T^*_2$ gives $N/\kappa_S < \rho_{NV} V_{NV} T^*_2/24$. Substituting the spin-photon coupling g and $N/\kappa_S$ into the masing threshold inequality, $Q \cdot (V_{NV}/V_{eff}) \cdot (\gamma_{NV}^2 \mu_0 \hbar/12) \cdot (\rho_{NV} T^*_2) > 1$ is obtained. Assuming a 10% N-to-NV conversion efficiency, $Q > Q_C$ can be obtained with threshold cavity Q factor $$Q_C \approx 30 V_{eff}/V_{NV}. \quad (22)$$

Increasing the filling factor $V_{NV}/V_{eff}$ can reduce the threshold cavity Q factor. For a 4.5 mm$^3$ diamond and $V_{eff}$ confined below 15 cm$^3$, the threshold cavity Q factor is below $10^5$. Moreover, using a larger size diamond can also reduce the threshold cavity Q factor but requires higher pump power.

The quantum Langevin equations are shown in Equation set (1), where $\hat{N}_e - \hat{N}_g = \hat{S}_z$, $\hat{N}_e + \hat{N}_g = \hat{N}$, the noise operator $\hat{F}_{e/g}$ is the population fluctuation in the spin state $|e/g\rangle$, $\hat{F}_e + \hat{F}_g$ is the fluctuation of the total NV center electron spin number due to population in the $m_s = +1$ state and other intermediate states, and $\hat{F}_{S/e}$ is the spin collective mode/photon noise. N can be used as the steady-state average value of $\hat{N}$. The mean-field theory can be considered well justified when masing occurs, since the fluctuations are much smaller than the expectation values of the operators in Equation set (1). The operators can be written as the sum of their expectation values and small fluctuations, i.e., $\hat{N}_{e/g} = \hat{N}_{e/g} + \delta \hat{N}_{e/g}$, $\hat{S}_\pm = S_\pm e^{\pm i\alpha t} + \delta \hat{S}_\pm$, $\hat{a} = \alpha e^{-i\alpha t} + \delta \hat{a}$, where $\omega$ is the steady-state frequency of the maser. The steady-state mean-field equations are $$0 = wN_g - \gamma_{eg} N_e + ig(a^* S_- - S_+ a), \quad (23)$$

$$0 = i(\omega - \omega_S) S_- - \frac{\kappa_S}{2} S_- + igS_z a, \quad (24)$$

$$0 = i(\omega - \omega_c) a - \frac{\kappa_c}{2} a - igS_-, \quad (25)$$

From Equations (23)-(25), Equation (26) can be obtained:

$$S_- = \frac{-igS_z a}{i(\omega - \omega_S) - \frac{\kappa_S}{2}}, \quad a = \frac{igS_-}{i(\omega - \omega_c) - \frac{\kappa_c}{2}}, \quad (26)$$

Which can give the spin polarization (population inversion)

$$S_z = \frac{[\kappa_c - 2i(\omega - \omega_c)][\kappa_S - 2i(\omega - \omega_S)]}{4g^2}. \quad (27)$$

The inversion $S_z$ being real requires $(\omega - \omega_c)\kappa_S + (\omega - \omega_S)\kappa_c = 0$, which determines the maser frequency $$\omega = \frac{\kappa_c \omega_S + \kappa_S \omega_c}{\kappa_c + \kappa_S}.$$

Inserting $\omega$ into Equation (27), $$S_z = \frac{\kappa_S \kappa_c}{4g^2}(1 + \delta_{cs}^2), \quad (28)$$

where $\delta_{cs} = 2(\omega_c - \omega_S)/\kappa_c + \kappa_S$ is the frequency mismatch between the spin transition and cavity. At resonance $\omega_c = \omega_S = \omega$, the solutions are $\kappa_S \kappa_c = 4g^2 S_z$, $\kappa_c a = -2igS_-$, and the spin collective mode and photon numbers satisfy $\kappa_c n_c = \kappa_S \langle S_+ S_-/S_z \rangle = \kappa_S n_S$. To calculate the spin-spin correlation, Equations (29)-(33) can be used.

$$\frac{d\langle \hat{N}_e \rangle}{dt} = w\langle \hat{N}_g \rangle - \gamma_{eg}\langle \hat{N}_e \rangle + ig(\langle \hat{a}^\dagger \hat{S}_- \rangle - \langle \hat{S}_+ \hat{a} \rangle), \quad (29)$$

$$\frac{d\langle \hat{N}_g \rangle}{dt} = -w\langle \hat{N}_g \rangle + \gamma_{eg}\langle \hat{N}_e \rangle - ig(\langle \hat{a}^\dagger \hat{S}_- \rangle - \langle \hat{S}_+ \hat{a} \rangle), \quad (30)$$

$$\frac{d\langle \hat{a}^\dagger \hat{S}_- \rangle}{dt} = -\frac{\kappa_S \kappa_c}{2}\langle \hat{a}^\dagger \hat{S}_- \rangle + ig\left[\left(1 - \frac{1}{N}\right) - \langle \hat{S}_+ \hat{S}_- \rangle + \langle \hat{N}_e \rangle + \langle \hat{a}^\dagger \hat{a} \rangle \langle \hat{S}_z \rangle\right], \quad (31)$$

$$\frac{d\langle \hat{S}_+^\dagger \hat{S}_- \rangle}{dt} = -\kappa_S \langle \hat{S}_+ \hat{S}_- \rangle - ig\langle \hat{S}_z \rangle(\langle \hat{a}^\dagger \hat{S}_- \rangle - \langle \hat{S}_+ \hat{a} \rangle), \quad (32)$$

$$\frac{d\langle \hat{a}^\dagger \hat{a} \rangle}{dt} = -\kappa_c \langle \hat{a}^\dagger \hat{a} \rangle - ig(\langle \hat{a}^\dagger \hat{S}_- \rangle - \langle \hat{S}_+ \hat{a} \rangle) + \kappa_c n_{th}, \quad (33)$$

where the symbol $\langle \ldots \rangle$ denotes the expectation values of the operators. Approximations can be used such that $\langle \hat{a}^\dagger \hat{a} \hat{S}_z \rangle \approx \langle \hat{a}^\dagger \hat{a} \rangle \langle \hat{S}_z \rangle$, $\langle \hat{a}^\dagger \hat{S}_z \hat{S}_- \rangle \approx \langle \hat{S}_z \rangle \langle \hat{a}^\dagger \hat{S}_- \rangle$, and $\langle \hat{S}_+ \hat{S}_z \hat{a} \rangle \approx \langle \hat{S}_z \rangle \langle \hat{S}_+ \hat{a} \rangle$, dropping the higher order correlations. The steady-state expectation values can be calculated by setting $d\langle \hat{N}_{e/g} \rangle/dt = d\langle \hat{a}^\dagger \hat{S}_- \rangle/dt = d\langle \hat{S}_+ \hat{S}_- \rangle/dt = d\langle \hat{a}^\dagger \hat{a} \rangle/dt = 0$, in Equations (29)-(33), leading to $$0 = wN_g - \gamma_{eg} N_e + ig(\langle \hat{a}^\dagger \hat{S}_- \rangle - \langle \hat{S}_+ \hat{a} \rangle), \quad (34)$$

$$0 = -\frac{\kappa_S \kappa_c}{2}\langle \hat{a}^\dagger \hat{S}_- \rangle + ig\left[\left(1 - \frac{1}{N}\right) - \langle \hat{S}_+ \hat{S}_- \rangle + N_e + \langle \hat{a}^\dagger \hat{a} \rangle S_z\right], \quad (35)$$

$$0 = -\kappa_S \langle \hat{S}_+ \hat{S}_- \rangle - igS_z(\langle \hat{a}^\dagger \hat{S}_- \rangle - \langle \hat{S}_+ \hat{a} \rangle), \quad (36)$$

$$0 = -\kappa_c \langle \hat{a}^\dagger \hat{a} \rangle - ig(\langle \hat{a}^\dagger \hat{S}_- \rangle - \langle \hat{S}_+ \hat{a} \rangle) + \kappa_c n_{th}. \quad (37)$$

The spin-spin correlation $\langle \hat{S}_+ \hat{S}_- \rangle$, the populations of the two spin states $N_{e/g}$, the spin polarization $S_z$, and the photon number $n_c$ can then be obtained from Equations (34)-(37). The incoherent thermal photons can be far less than the stimulated emission photons and can mainly affect the linewidth of the microwave field. Above the threshold for population inversion ($w \gg \gamma_{eg}$), $n_{th}$ can safely be neglected in Equations (34)-(37). Solving Equations (34)-(37) yields a quadratic equation about $S_z$, that is, $$S_z^2 - \left[\frac{w-\gamma_{eg}}{w+\gamma_{eg}}N + \frac{\frac{\kappa_S+\kappa_c}{4g^2} + \frac{1}{w+\gamma}}{(1-N^{-1})\frac{1}{\kappa_S} + \frac{1}{\kappa_c}}\right]S_z + \quad (38)$$

$$\frac{\frac{w-\gamma_{eg}}{w+\gamma_{eg}}N + \frac{\kappa_S+\kappa_c}{4g^2} - \frac{1}{w+\gamma}}{(1-N^{-1})\frac{1}{\kappa_S} + \frac{1}{\kappa_c}} = 0.$$

Because $$\frac{\kappa_S+\kappa_c}{4g^2} \gg \frac{1}{w\pm\gamma_{eg}}$$

and N≫1, $$\frac{\kappa_S+\kappa_c}{4g^2} \pm \frac{1}{w\pm\gamma_{eg}} \approx \frac{\kappa_S+\kappa_c}{4g^2}$$

and $(1-N^{-1})\approx 1$. Equation (38) can be further reduced to $$S_z^2 - \left(\frac{w-\gamma_{eg}}{w+\gamma_{eg}}N + \frac{\kappa_S\kappa_c}{4g^2}\right)S_z + \frac{w-\gamma_{eg}}{w+\gamma_{eg}}N \times \frac{\kappa_S\kappa_c}{4g^2} = 0. \quad (39)$$

The population inversion in the masing region can be given by the stable solution $$S_z = \frac{\kappa_S\kappa_c}{4g^2}. \quad (40)$$

In the amplifying region, the stable solution can be $$S_z = \frac{w-\gamma_{eg}}{w+\gamma_{eg}}N.$$

The spin-spin correlation can be determined from Equations (34)-(37) as $$\langle \hat{S}_+\hat{S}_-\rangle = \frac{w}{2\kappa_S}S_z\left[\left(1-\frac{\gamma_{eg}}{w}\right)N - \left(1+\frac{\gamma_{eg}}{w}\right)S_z\right]. \quad (41)$$

It can reach maximum value $$\langle \hat{S}_+\hat{S}_-\rangle = \frac{N^2}{8q}\left(1-\frac{\kappa_c}{2Ng^2T_2^*}\right)^2, \quad (42)$$

at pump rate $w=(2Ng^2/\kappa_c-1/T^*_2)/q$. The maximum spin-spin correlation is proportional to $N^2$ provided that $2Ng^2T^*_2 \gg \kappa_e$, which is satisfied when the maser operates well above the threshold. Maximum spin-spin correlation can be reached when the pump rate $w=(2Ng^2/\kappa_c-1/T^*_2)/q$, where the spin ensemble is at half inversion ($S_z=N/2$). The incoherent population is mainly the thermal photons ($n_{incoh}\approx n_{th}$) at room temperature ($n_{th}\gg N_e/S_z=3/2$). Thus, the diffusion coefficient can become $\gamma_{ST}\approx n_{th}\kappa_c/(2n_c)$, and the minimal diffusion coefficient and maximal coherence time can be $\gamma_{ST}\approx qn_{th}\kappa_c^3/(N^2g^2)$ and $T_{coh}\approx 2N^2g^2/(qn_{th}\kappa_c^3)$, respectively.

The linearized quantum Langevin equations for the fluctuations are (second order terms such as $\delta\hat{a}^\dagger\delta\hat{S}_-$ dropped):

$$\frac{d\delta\hat{N}_e}{dt} = \quad (43)$$
$$+w\delta\hat{N}_g - \gamma_{eg}\delta\hat{N}_e + ig(S_-\delta\hat{a}^\dagger - S_+\delta\hat{a}) + ig(a^*\delta\hat{S}_- - a\delta\hat{S}_+) + \hat{F}_e,$$

$$\frac{d\delta\hat{N}_g}{dt} = \quad (44)$$
$$-w\delta\hat{N}_g + \gamma_{eg}\delta\hat{N}_e - ig(S_-\delta\hat{a}^\dagger - S_+\delta\hat{a}) - ig(a^*\delta\hat{S}_- - a\delta\hat{S}_+) + \hat{F}_e,$$

$$\frac{d\delta\hat{S}_-}{dt} = -\frac{k_S}{2}\delta\hat{S}_- + igS_z\delta\hat{a} + iga(\delta\hat{N}_e - \delta\hat{N}_g) + \hat{F}_S, \quad (45)$$

$$\frac{d\delta\hat{a}}{dt} = -\frac{\kappa_c}{2}\delta\hat{a} - ig\delta\hat{S}_- + \hat{F}_c. \quad (46)$$

Here the resonant condition $\omega_c=\omega_S$ is assumed. By Fourier transform $\delta\hat{a}(\Omega)=(2\pi)^{-1/2}\int_{-\infty}^{+\infty}e^{j\Omega t}\delta\hat{a}(t)dt$ try for $\delta\hat{a}(t)$ and other fluctuation operators, the noise operators in the frequency domain can be obtained. Without loss of generality, the intracavity field a can be set as a real number. Under the resonant condition, the spin collective mode amplitude can be purely imaginary.

The quantum Langevin equations in frequency domain yield $$-i\Omega\delta\hat{S}_-(\Omega) = \quad (47)$$
$$-\frac{\kappa_S}{2}\delta\hat{S}_-(\Omega) + iga[\delta\hat{N}_e(\Omega) - \delta\hat{N}_g(\Omega)] + igS_z\delta\hat{a}(\Omega) + \hat{F}_S(\Omega),$$

$$-i\Omega\delta\hat{S}_+(\Omega) = \quad (48)$$
$$-\frac{\kappa_S}{2}\delta\hat{S}_+(\Omega) - iga^*[\delta\hat{N}_e(\Omega) - \delta\hat{N}_g(\Omega)] - igS_z\delta\hat{a}^\dagger(\Omega) + \hat{F}_S^\dagger(\Omega),$$

$$-i\Omega\delta\hat{a}(\Omega) = -\frac{\kappa_c}{2}\delta\hat{a}(\Omega) - ig\delta\hat{S}_-(\Omega) + \hat{F}_c(\Omega), \quad (49)$$

$$-i\Omega\delta\hat{a}^\dagger(\Omega) = -\frac{\kappa_c}{2}\delta\hat{a}^\dagger(\Omega) - ig\delta\hat{S}_+(\Omega) + \hat{F}_c^\dagger(\Omega). \quad (50)$$

The phase fluctuation of spin collective modes is $$\delta\hat{\phi}_S = [\delta\hat{S}_-(\Omega) + \delta\hat{S}_+(\Omega)] = \quad (51)$$
$$\frac{i\left(\frac{\kappa_c}{2} - i\Omega\right)[\hat{F}_S(\Omega) + \hat{F}_S^\dagger(\Omega)] - \frac{\kappa_c\kappa_S}{4g}[\hat{F}_c(\Omega) - \hat{F}_c^\dagger(\Omega)]}{\Omega\left(\frac{\kappa_c+\kappa_S}{2} - i\Omega\right)},$$

And that of photons is $$\delta\hat{\phi}_c = -i[\delta\hat{a}(\Omega) - \delta\hat{a}^\dagger(\Omega)] = \quad (52)$$
$$\frac{\left(\frac{\kappa_S}{2} - i\Omega\right)[\hat{F}_c(\Omega) + \hat{F}_c^\dagger(\Omega)] - ig[\hat{F}_S(\Omega) + \hat{F}_S^\dagger(\Omega)]}{\Omega\left(\frac{\kappa_c+\kappa_S}{2} - i\Omega\right)},$$

With the correlation functions of the field noise operators, $\langle\hat{F}_c(\Omega)\hat{F}_c(\Omega')\rangle=0$, $\langle\hat{F}_c^\dagger(\Omega)\hat{F}_c(\Omega')\rangle=\kappa_c n_{th}\delta(\Omega+\Omega')$, and $\langle\hat{F}_c$ $(\Omega)\hat{F}_c^\dagger(\Omega')\rangle = \kappa_c(1+n_{th})\delta(\Omega+\Omega')$, $[\hat{F}_c(\Omega)-\hat{F}_c^\dagger(\Omega)][\hat{F}_c(\Omega')-\hat{F}_c^\dagger(\Omega')] = -\kappa_c(1+2n_{th})\delta(\Omega+\Omega')$ can be obtained. Similarly, the noise operators for the spins can satisfy $[\hat{F}_S(\Omega)+\hat{F}_S^\dagger(\Omega)][\hat{F}_S(\Omega')+\hat{F}_S^\dagger(\Omega')] = N\kappa_S\delta(\Omega+\Omega')$.

The phase noise spectrum $S_c(\Omega) = \langle \delta\hat{\phi}_c(\Omega)\delta\hat{\phi}_c(-\Omega)\rangle$ can be calculated as $$\frac{S_c(\Omega)}{4n_c} = \frac{\left(\frac{\kappa_c+\kappa_S}{2}\right)^2}{\Omega^2\left[\left(\frac{\kappa_c+\kappa_S}{2}\right)^2+\Omega^2\right]}\left[\frac{g^2 N\kappa_S\left(\frac{\kappa_S^2}{4}+\Omega^2\right)\kappa_c(1+2n_{th})}{4n_c\left(\frac{\kappa_c+\kappa_S}{2}\right)^2}\right]. \quad (53)$$

The maser linewidth can be determined by the phase noises at low frequencies, $\Omega \ll (\kappa_c+\kappa_S)/2$. The linewidth can be much less than the cavity and spin collective mode decay rates, so the time derivative of the maser phase fluctuation correlation function can be approximated as $$\left\langle \frac{d}{dt}\delta\hat{\phi}_c(t)\frac{d}{dt'}\delta\hat{\phi}_c(t')\right\rangle = \frac{1}{2\pi}\int_{-\infty}^{+\infty} e^{-i\Omega(t-t')}\Omega^2 S_c(\Omega)d\Omega \approx \gamma_{ST}\delta(t-t'),$$

where $$\gamma_{ST} = \quad (54)$$

$$\left(\frac{N_e}{S_z}+n_{th}\right)\frac{\kappa_c}{2n_c}\left(\frac{\kappa_S}{\kappa_c+\kappa_S}\right)^2 = n_{incoh} \cdot \frac{1}{n_c+n_S} \cdot \frac{1}{(\kappa_S/2)^{-1}+(\kappa_c/2)^{-1}},$$

is the Schawlow-Townes diffusion coefficient, with incoherent spin collective mode and photon number $n_{incoh} = N_e/S_z + n_{th}$. For $t \gg 2/(\kappa_c+\kappa_S)$, the phase correlation is $\langle \delta\hat{\phi}_c^2(t)\rangle = \int_0^t dt' \int_0^t dt'' \langle \delta\hat{\phi}_c(t')\delta\hat{\phi}_c(t'')\rangle = \gamma_{ST} \cdot t$. Neglecting the amplitude fluctuation (which is negligible at steady-state) and assuming Gaussian statistics for the phase fluctuation, the spectrum of the cavity photon field is $$\langle \hat{a}^\dagger(\Omega)\hat{a}(-\Omega)\rangle = \int_{-\infty}^{+\infty} dt e^{i\Omega t}\langle \hat{a}^\dagger(t)\hat{a}(0)\rangle \quad (55)$$

$$= n_c \int_{-\infty}^{+\infty} dt e^{i(\Omega-\omega_c)t} e^{-\langle \delta\hat{\phi}_c^2(t)\rangle/2}$$

$$= n_c \frac{\gamma_{ST}}{(\Omega-\omega_c)^2+(\gamma_{ST}/2)^2}.$$

The photon field has a full-width-half-maximum linewidth $\gamma_{ST}/2\pi$. Correspondingly, the coherence time of the maser is $T_{coh} = 2/\gamma_{ST}$.

With an input signal $s_{in}e^{-i\omega_{in}t}$, the steady-state Langevin equations are $$0 = i(\omega_{in}-\omega_S)S_- - \frac{\kappa_S}{2}S_- + igS_z a, \quad (56)$$

$$0 = wN_g - \gamma_{eg}N_e + ig(a^*S_- - S_+ a), \quad (57)$$

$$0 = i(\omega_{in}-\omega_c)a - \frac{\kappa_c}{2}a - igS_- + \sqrt{\kappa_{ex}}s_{in}, \quad (58)$$

$$s_{out} = s_{in} - \sqrt{\kappa_{ex}}a. \quad (59)$$

With the input signal detuning denoted as $\Omega_{S,c} = \omega_{in} - \omega_{S,c}$, the inversion and output can satisfy $$\frac{w-\gamma_{eg}}{w+\gamma_{eg}} = \left\{1 + \frac{\frac{2\kappa_{ex}}{\kappa_c}\frac{4g^2}{\kappa_S\kappa_c}\frac{4|s_{in}|^2}{w+\gamma_{eg}}}{\left(\frac{4\delta_S^2}{\kappa_S^2}+1\right)\left(\frac{4\delta_c^2}{\kappa_c^2}+1\right)-1+2\frac{4\delta_S\delta_c}{\kappa_S\kappa_c}\frac{4g^2}{\kappa_S\kappa_c}S_z + \left(\frac{4g^2}{\kappa_S\kappa_c}S_z-1\right)^2}\right\}\frac{S_z}{N}, \quad (60)$$

$$s_{out} = \frac{\left(1-\frac{2\kappa_{ex}}{\kappa_c}\right) - \frac{4\delta_S\delta_c}{\kappa_S\kappa_c} - \frac{4g^2}{\kappa_S\kappa_c}S_z - i\left[\left(1-\frac{2\kappa_{ex}}{\kappa_c}\right)\frac{2\delta_S}{\kappa_S}+\frac{2\delta_c}{\kappa_c}\right]}{1-\frac{4\delta_S\delta_c}{\kappa_S\kappa_c}-\frac{4g^2}{\kappa_S\kappa_c}S_z - i\left(\frac{2\delta_S}{\kappa_S}+\frac{2\delta_c}{\kappa_c}\right)}s_{in}. \quad (61)$$

The power gain is $G = |s_{out}|^2/|s_{in}|^2$. For detuning between the cavity, electron spin, and the input signal frequencies $\delta_{S,c}/\kappa_{S,c} \gtrsim 1$, the power gain would be significantly reduced to $G \sim O(1)$. However, large power gain is possible under the resonant input condition $\delta_{S,c} = 0$.

In the following, the resonant input condition is assumed. It is also assumed that the cavity loss is mainly caused by the coupling to the input-output channel, i.e., The inversion reduces to an exactly solvable cubic equation $$\frac{w-\gamma_{eg}}{w+\gamma_{eg}}N = \left[1+2\frac{4g^2}{\kappa_S\kappa_c}\frac{4|s_{in}|^2}{w+\gamma_{eg}}\left(1-\frac{4g^2}{\kappa_S\kappa_c}S_z\right)^{-2}\right]S_z. \quad (62)$$

and the power gain reduces to $$G = \left(1+\frac{4g^2}{\kappa_S\kappa_c}S_z\right)^2 / \left(1-\frac{4g^2}{\kappa_S\kappa_c}S_z\right)^2. \quad (63)$$

In the amplifying region, the population inversion for weak input signal $$|s_{in}|^2 \ll \frac{g^2(w+\gamma_{eg})}{2\kappa_S\kappa_c}\left(\frac{w-\gamma_{eg}}{w+\gamma_{eq}}N-\frac{\kappa_S\kappa_c}{4g^2}\right)^2$$

can be approximately obtained as $$S_z = \frac{w-\gamma_{eg}}{w+\gamma_{eq}}N\left[1-2\frac{\kappa_S\kappa_c}{4g^2}\frac{4|s_{in}|^2}{w+\gamma_{eg}}\left(\frac{w-\gamma_{eg}}{w+\gamma_{eq}}N-\frac{\kappa_S\kappa_c}{4g^2}\right)^{-2}\right]. \quad (64)$$

Meanwhile, the power gain can be independent of the input signal, as $$G = \left(\frac{w-\gamma_{eg}}{w+\gamma_{eq}}N+\frac{\kappa_S\kappa_c}{4g^2}\right)^2 / \left(\frac{w-\gamma_{eg}}{w+\gamma_{eq}}N-\frac{\kappa_S\kappa_c}{4g^2}\right)^2. \quad (65)$$

The output power can depend linearly on the weak input signal in the amplifying region.

In the masing region, the approximate inversion for weak input signal $$|s_{in}|^2 \ll \frac{w + \gamma_{eg}}{8}\left(\frac{w - \gamma_{eg}}{w + \gamma_{eq}}N - \frac{\kappa_S \kappa_c}{4g^2}\right)$$

can be $$S_z = \frac{\kappa_S \kappa_c}{4g^2}\left(1 - 2\sqrt{\frac{2|s_{in}|^2}{w + \gamma_{eq}}\left(\frac{w - \gamma_{eg}}{w + \gamma_{eq}}N - \frac{\kappa_S \kappa_c}{4g^2}\right)^{-1}}\right), \quad (66)$$

and the power gain can depend on the input signal (nonlinear amplification), as $$G = \left(\sqrt{\frac{w + \gamma_{eq}}{2|s_{in}|^2}\left(\frac{w - \gamma_{eg}}{w + \gamma_{eq}}N - \frac{\kappa_S \kappa_c}{4g^2}\right)} - 1\right)^2. \quad (67)$$

The output power can be independent of the weak input signal in the masing region FIGS. 15A-15C show the inversion, the power gain, and the noise temperature, respectively, as functions of pump rate for a weak input signal ($P_{in}=1$ fW) and a fixed microwave cavity Q factor ($Q=5\times10^4$). The threshold pump power for microwave amplifying can be, for example, about 2.7 W (at $w=\gamma_{eg}=200$ s$^{-1}$), the threshold pump power for masing can be about 4.3 W (at $w=w_{th}$ 316 s$^{-1}$). For pump below the threshold for population inversion ($w<\gamma_{eg}$), the system can be in the absorbing region ($G_{dB}<0$ dB). For pump above the threshold for population inversion ($w>\gamma_{eg}$), the system can work as a microwave amplifier until reaching the masing region ($w>w_{th}$), which shuts down when over-pumping occurs ($w>w_{max}$). The power gain can significantly increase near the masing threshold and the noise temperature can be at sub-Kelvin level.

FIGS. 16A-16D show the dependence of the power gain on the cavity Q factor, the pump rate, and the input signal power. The amplifying region at weak pump rate (e.g., 200 s$^{-1}$<w<316 s$^{-1}$ for $Q=5\times10^4$) can become narrower as cavity Q factor increases.

To estimate magnetic field sensitivity, a magnetic field noise $\delta B$, which induces a frequency noise of all the NV spins $\delta\omega_S = \gamma_{NV}\delta B$, can be considered. The input noise of the cavity can be expressed as $\hat{F}_c(t) = \sqrt{\kappa_c^{ex}}\delta\hat{s}_{in}(t) + \sqrt{\kappa_c^{vac}}\delta\hat{s}_{vac}(t)$, including the cavity internal noise $\delta\hat{s}_{vac}(t)$ and the interaction with the input-output channel $\delta\hat{s}_{in}(t)$. The noise operators can satisfy the commutation relations $[\delta\hat{s}_{in}(t), \delta\hat{s}_{in}^\dagger(t')] = [\delta\hat{s}_{vac}(t), \delta\hat{s}_{vac}^\dagger(t')] = \delta(t-t')$. Both the internal noise and the input-output channel noise can contribute to the cavity photon decay, i.e., $\kappa_c = \kappa_c^{ex} + \kappa_c^{vac}$. The output field noise is $\delta\hat{s}_{out}(t) = \delta\hat{s}_{in} - \sqrt{\kappa_c^{ex}}\delta\hat{a}(t)$, and the output field is $\delta\hat{s}_{out} - \sqrt{\kappa_c^{ex}}\delta\hat{a}(t)$ corresponding to output photon flux $\langle\hat{s}_{out}^\dagger \hat{s}_{out}\rangle = \kappa_c^{ex}n_c$. With a small internal cavity loss ($\kappa_c^{vac}/\kappa_c \to 0$), all the cavity decay results in output, and the output power is $P_{out} \approx \hbar\omega_c \cdot \kappa_c \cdot n_c$.

The noises can limit the measurement sensitivity when the maser device is used as a sensor. The noise spectrum can mainly include the following four contributions: (i) the photon shot noise; (ii) the Schawlow-Townes linewidth; (iii) the magnetic field noise; and (iv) the resonator size (dimensional) and dielectric constant noises resulting from temperature fluctuation. The photon shot noise (i) can be dominant in short-time measurements but negligible in long-time measurement as compared with the quantum diffusion (ii, iii, and iv), which determines the coherence time or equivalently the maser linewidth. When the magnetic field (temperature) noise is dominant in the quantum diffusion, the magnetic field (temperature) noise can be derived from the maser coherence time. When the magnetic field and temperature are well stabilized with negligible fluctuations, the maser coherence time and hence the sensitivity is fundamentally limited by the ST-linewidth (ii).

In order to calculate the magnetic field sensitivity limit, the resonator with negligible temperature noise can be considered. The magnetic field sensitivity can be obtained from the noise spectral density of the output field, $S_{out}(\Omega) = \langle\{-i[\delta\hat{s}_{out}(\Omega) - \delta\hat{s}_{out}^\dagger(\Omega)]\}\{-i[\delta\hat{s}_{out}(\Omega)(-\Omega) - \delta\hat{s}_{out}^\dagger(\Omega)]\}\rangle$, which gives $$S_{out}(\Omega) = 1 + \frac{4\kappa_c n_c}{\Omega^2} \quad (68)$$

$$\left[\frac{\left(\frac{\kappa_S}{2}\right)^2}{\left(\frac{\kappa_c + \kappa_S}{2}\right)^2 + \Omega^2}n_{incoh}\frac{\kappa_c}{2n_c} + \frac{\left(\frac{\kappa_c}{2}\right)^2}{\left(\frac{\kappa_c + \kappa_S}{2}\right)^2 + \Omega^2}(\gamma_{NV}\delta B\sqrt{\tau})^2\right].$$

where the term "1" comes from photon shot noise, the first term in the bracket corresponds to background due to the maser phase fluctuation (linewidth), and the second term in the bracket results from the magnetic field noise. Thus, the magnetic field sensitivity is limited by the other two terms as $$\delta B\sqrt{\tau} = \frac{1}{\gamma_{NV}}\frac{\kappa_c + \kappa_S}{\kappa_c}\sqrt{\frac{\Omega^2}{4\kappa_c n_c}\left[1 + \frac{4\Omega^2}{(\kappa_c + \kappa_S)^2}\right]} + \gamma_{ST}. \quad (69)$$

The photon shot noise term is negligible under the slow-noise condition $\Omega \ll \sqrt{2n_{incoh}}\kappa_c\kappa_S/(\kappa_c+\kappa_S)$, $(\kappa_c+\kappa_S)/2$, so the magnetic field sensitivity can be determined by coherence time (quantum diffusion) of the maser $$\delta B\sqrt{\tau} = \quad (70)$$

$$\frac{1}{\gamma_{NV}}\frac{\kappa_S}{\kappa_c}\sqrt{n_{incoh}\frac{\kappa_c}{2n_c}} = \frac{1}{\gamma_{NV}}\frac{\kappa_S + \kappa_c}{\kappa_c}\sqrt{\gamma_{ST}} = \frac{1}{\gamma_{NV}}\frac{\kappa_c + \kappa_S}{\kappa_c}\sqrt{\frac{2}{T_{coh}}}.$$

Similarly, the sensitivity limit of the temperature noise can be determined by setting the magnetic field as well stabilized. The result of the output noise is $$S_{out}(\Omega) = 1 + \quad (71)$$

$$\frac{4\kappa_c n_c}{\Omega^2}\left[\frac{(\kappa_S/2)^2}{\left(\frac{\kappa_S + \kappa_c}{2}\right)^2 + \Omega^2}n_{incoh}\frac{\kappa_c}{2n_c} + \frac{(\kappa_S/2)^2 + \Omega^2}{\left(\frac{\kappa_S + \kappa_c}{2}\right)^2 + \Omega^2}(g_0\delta T\sqrt{\tau})^2\right],$$

where $g_0 \approx (\alpha+\beta/2)\omega_c = 165$ kHz K$^{-1}$ (from Equation set (1)). For low frequency noise [$\Omega \ll \sqrt{2n_{incoh}}\kappa_c\kappa_S/(\kappa_c+\kappa_S)$, $(\kappa_c+\kappa_S)/2$], the temperature sensitivity limited by the coherence time (quantum diffusion) is $$\delta T \sqrt{\tau} = \frac{1}{g_0}\sqrt{n_{incoh}\frac{\kappa_c}{2n_c}} = \frac{1}{g_0}\frac{\kappa_c + \kappa_S}{\kappa_c}\sqrt{\gamma_{ST}} = \frac{1}{g_0}\frac{\kappa_c + \kappa_S}{\kappa_S}\sqrt{\frac{2}{T}}. \quad (72)$$

In an embodiment, a method of providing microwave amplification can include using a system as described herein for its intended purpose. Such a method can include providing radiation (e.g., light, such as visible light) to the system (e.g., using an optical pump such as an optical laser) to cause masing and/or amplification.

In another embodiment, a method of fabricating a maser system can include providing the components and assembling them to arrive at a system described herein.

Embodiments of the subject invention provide advantageous masers and microwave amplifiers that can function at room temperature in the continuous-wave mode. Room-temperature diamond masers and microwave amplifiers of the subject invention have numerous applications, including but not necessarily limited to enhanced magnetic resonance spectroscopy, high-precision clocks, deep-space communication, navigation, radar and positioning, and cosmology observation.

The subject invention includes, but is not limited to, the following exemplified embodiments.

Embodiment 1

A maser system, comprising:
a gain medium;
a resonator disposed around the gain medium;
a cavity box disposed around the resonator; and
a magnet array disposed around the gain medium,
wherein the gain medium comprises diamond having a plurality of nitrogen-vacancy (NV) centers.

Embodiment 2

The maser system according to embodiment 1, wherein the diamond having a plurality of NV centers is a single-crystal diamond.

Embodiment 3

The maser system according to any of embodiment 1-2, wherein the resonator is a sapphire dielectric resonator.

Embodiment 4

The maser system according to any of embodiments 1-3, wherein the magnet array is a Halbach magnet array.

Embodiment 5

The maser system according to any of embodiments 1-4, wherein the magnet array comprises sixteen magnets.

Embodiment 6

The maser system according to any of embodiments 1-5, wherein the magnet array is disposed around the cavity box.

Embodiment 7

The maser system according to any of embodiments 1-6, wherein the resonator has a cylindrical shape, and wherein the cavity box has a cylindrical shape.

Embodiment 8

The maser system according to embodiment 7, wherein the resonator and the cavity box are coaxial.

Embodiment 9

The maser system according to any of embodiments 1-8, wherein the magnet array has an annulus shape.

Embodiment 10

The maser system according to any of embodiments 1-9, further comprising a support substrate on which the resonator is disposed, wherein the support substrate is disposed within the cavity box.

Embodiment 11

The maser system according to embodiment 10, wherein the support substrate is a quartz substrate.

Embodiment 12

The maser system according to any of embodiments 1-11, wherein the system has a cavity Q factor of at least 10,000.

Embodiment 13

The maser system according to any of embodiments 1-11, wherein the system has a cavity Q factor of at least 50,000.

Embodiment 14

The maser system according to any of embodiments 1-11, wherein the system has a cavity Q factor of about 50,000.

Embodiment 15

The maser system according to any of embodiments 1-14, wherein the NV concentration within the diamond gain medium is less than 100 parts per million (ppm).

Embodiment 16

The maser system according to any of embodiments 1-14, wherein the NV concentration within the diamond gain medium is less than 10 ppm.

Embodiment 17

The maser system according to any of embodiments 1-14, wherein the NV concentration within the diamond gain medium is about 2 ppm.

Embodiment 18

The maser system according to any of embodiments 1-17, wherein the cavity box includes an opening to receive radiation.

Embodiment 19

The maser system according to any of embodiments 1-18, further comprising an optical pump disposed outside the cavity box and configured to provide electromagnetic radiation to the gain medium through an opening in the cavity box.

Embodiment 20

The maser system according to embodiment 19, wherein the optical pump is an optical laser.

Embodiment 21

The maser system according to any of embodiments 19-20, wherein the electromagnetic radiation is visible light.

Embodiment 22

The maser system according to embodiment 21, wherein the radiation is green light (e.g., green light having a wavelength of 532 nanometers (nm)).

Embodiment 23

The maser system according to any of embodiments 1-22, wherein the magnet array provides a homogenous magnetic field to the gain medium.

Embodiment 24

The maser system according to embodiment 23, wherein the homogenous magnetic field is at least 1,028 Gauss.

Embodiment 25

A method of providing microwave amplification, comprising:
providing the maser system according to any of embodiments 1-24; and
providing electromagnetic radiation to the maser system, thereby causing the maser system to emit microwave radiation.

Embodiment 26

The method according to embodiment 25, wherein the maser system operates in continuous-wave mode at room temperature.

Embodiment 27

The method according to any of embodiments 25-26, wherein the electromagnetic radiation is pumped into the cavity box of the maser system at a pump rate that is higher than the decay rate, and wherein the cavity Q factor of the maser system is at or above a masing threshold of the maser system, such that the maser system operates as a maser.

Embodiment 28

The method according to any of embodiments 25-26, wherein the electromagnetic radiation is pumped into the cavity box of the maser system at a pump rate that is higher than the decay rate, and wherein the cavity Q factor of the maser system is below a masing threshold of the maser system, such that the maser system operates as a microwave amplifier.

Embodiment 29

The method according to embodiment 28, wherein a power gain of the maser system is at least 6 dB.

Embodiment 30

A maser system, comprising:
a gain medium;
a resonator disposed around the gain medium; and
a cavity box disposed around the resonator,
wherein the gain medium comprises diamond having a plurality of nitrogen-vacancy (NV) centers.

Embodiment 31

The maser system according to embodiment 30, wherein the diamond having a plurality of NV centers is a single-crystal diamond.

Embodiment 32

The maser system according to any of embodiment 30-31, wherein the resonator is a sapphire dielectric resonator.

Embodiment 33

The maser system according to any of embodiments 30-32, wherein the resonator has a cylindrical shape.

Embodiment 34

The maser system according to any of embodiments 30-33, wherein the cavity box has a parallelepiped shape.

Embodiment 35

The maser system according to any of embodiments 30-34, further comprising a support substrate on which the resonator is disposed, wherein the support substrate is disposed within the cavity box.

Embodiment 36

The maser system according to embodiment 35, wherein the support substrate is a quartz substrate.

Embodiment 37

The maser system according to any of embodiments 30-36, wherein the system has a cavity Q factor of at least 10,000.

Embodiment 38

The maser system according to any of embodiments 30-36, wherein the system has a cavity Q factor of at least 50,000.

Embodiment 39

The maser system according to any of embodiments 30-36, wherein the system has a cavity Q factor of about 50,000.

Embodiment 40

The maser system according to any of embodiments 30-39, wherein the NV concentration within the diamond gain medium is less than 100 parts per million (ppm).

Embodiment 41

The maser system according to any of embodiments 30-39, wherein the NV concentration within the diamond gain medium is less than 10 ppm.

Embodiment 42

The maser system according to any of embodiments 30-39, wherein the NV concentration within the diamond gain medium is about 2 ppm.

Embodiment 43

The maser system according to any of embodiments 30-42, wherein the cavity box includes an opening to receive radiation.

Embodiment 44

The maser system according to any of embodiments 30-43, further comprising an optical pump disposed outside the cavity box and configured to provide electromagnetic radiation to the gain medium through an opening in the cavity box.

Embodiment 45

The maser system according to embodiment 43, wherein the optical pump is an optical laser.

Embodiment 46

The maser system according to any of embodiments 44-45, wherein the electromagnetic radiation is visible light.

Embodiment 47

The maser system according to embodiment 46, wherein the radiation is green light (e.g., green light having a wavelength of 532 nanometers (nm)).

Embodiment 48

A method of providing microwave amplification, comprising:
providing the maser system according to any of embodiments 30-47; and
providing electromagnetic radiation to the maser system, thereby causing the maser system to emit microwave radiation.

Embodiment 49

The method according to embodiment 48, wherein the maser system operates in continuous-wave mode at room temperature.

Embodiment 50

The method according to any of embodiments 48-49, wherein the electromagnetic radiation is pumped into the cavity box of the maser system at a pump rate that is higher than the decay rate, and wherein the cavity Q factor of the maser system is at or above a masing threshold of the maser system, such that the maser system operates as a maser.

Embodiment 51

The method according to any of embodiments 48-49, wherein the electromagnetic radiation is pumped into the cavity box of the maser system at a pump rate that is higher than the decay rate, and wherein the cavity Q factor of the maser system is below a masing threshold of the maser system, such that the maser system operates as a microwave amplifier.

Embodiment 52

The method according to embodiment 51, wherein a power gain of the maser system is at least 6 dB.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A single crystal bulk diamond of volume $V_{NV}=3\times3\times0.5$ mm$^3$ with natural abundance (1.1%) of $^{13}$C nuclear spins, P1 center concentration of about 20 ppm, and NV center concentration of 2 ppm (for N-to-NV conversion efficiency 10%) was fabricated. The ensemble spin decoherence time was $T^*_2=0.4$ μs. Considering the four orientations of NV centers and three nuclear spin states of $^{14}$N, the number of NV centers coupled to the cavity mode was estimated to be $N=\rho_{NV}V_{NV}/12=1.32\times10^{14}$. The external magnetic field was 2,100 Gauss, resulting in $\omega_s/2\pi\approx3$ GHz. The microwave dielectric resonator had its $TE_{01\delta}$ mode frequency resonant with the spin collective mode, i.e., $\omega_c=\omega_S$. The cavity system was similar to that depicted in FIG. 1 and included a cylindrical sapphire dielectric resonator (radius of 15 mm and height of 16 mm) and a coaxial cylindrical cavity (radius of 40 mm and height of 40 mm), placed inside a 50 mm inner radius Halbach magnet array (sixteen magnets arranged as depicted in FIG. 1) that provided a uniform magnetic field. The coupling between a microwave photon and an NV center spin was calculated to be $g/2\pi\approx0.02$ Hz for the effective cavity mode volume $V_{eff}\approx3$ cm$^3$. At room temperature (T=300 K), the phonon scattering dominated the spin relaxation and $\gamma_{eg}\approx200$ s$^{-1}$. The number of thermal photons inside the cavity was $n_{th}\approx2,100$.

Several performance characteristics of the maser system were tested and are shown in FIGS. 7-16. In all of these figures, the parameters were such that $\omega_c/2\pi=\omega_s/2\pi=3$ GHz, $g/2\pi=0.02$ Hz, $T^*_2=0.4$ μs, $N=1.32\times10^{14}$, and $\gamma_{eg}=200$ s$^{-1}$ at T=300 K. FIG. 7 shows a plot of spin polarization as functions of pump rate and cavity Q factor for the fabricated system, FIG. 8 shows a plot of microwave output power as functions of pump rate and cavity Q factor, FIG. 9 shows a plot of spin-spin correlation as functions of pump rate and cavity Q factor, and FIG. 10 shows a plot of macroscopic quantum coherence time as functions of pump rate and cavity Q factor. FIG. 11A shows a plot of gain time as functions of pump rate and cavity Q factor, and the inset shows dependence on pump rate for a fixed $Q=5\times10^4$ for resonant input microwave power $P_{in}=1$ femtoWatt (fW). FIG. 11B shows the output power as function of the resonant input power for fixed cavity $Q=1\times10^4$ and $Q=2\times10^4$ for resonant input microwave power $P_{in}=1$ fW. FIG. 11C shows a plot of noise temperature as functions of pump rate and cavity Q factor for a system according to an embodiment of the subject invention, and the inset shows dependence on pump rate for a fixed $Q=5\times10^4$ for resonant input microwave power $P_{in}=1$ fW. FIG. 11D shows a plot of spin inversion as functions of pump rate and cavity Q factor for a system according to an embodiment of the subject invention. The inset shows dependence on pump rate for a fixed $Q=5\times10^4$ for resonant input microwave power $P_{in}=1$ fW.

Figure 12:
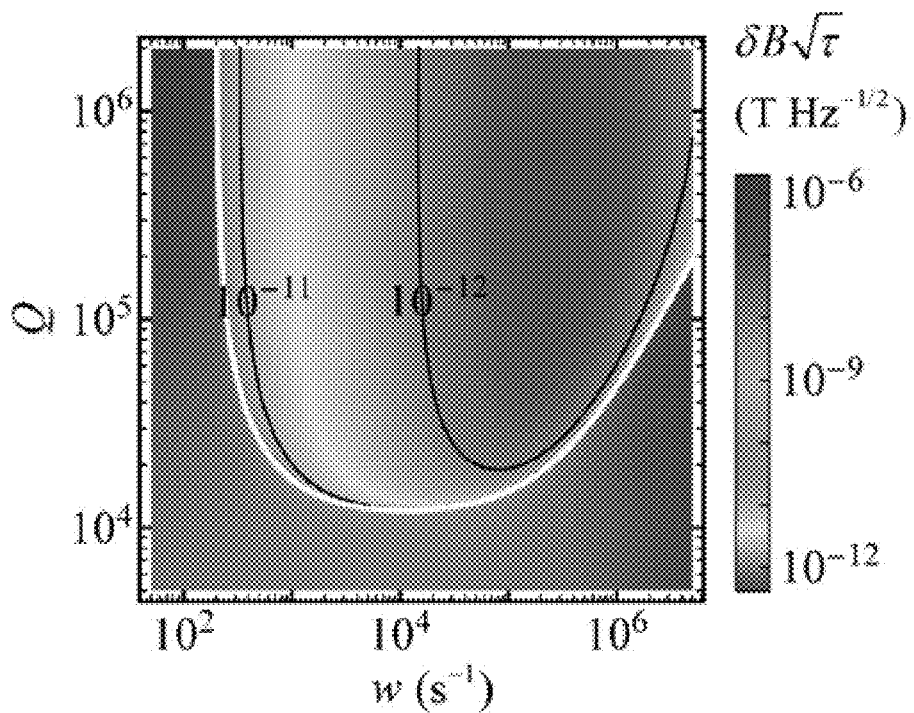
FIG. 12 shows a plot of sensitivity on external magnetic field as functions of pump rate and cavity Q factor for a system according to an embodiment of the subject invention. The parameters are such that $\omega_c/2\pi=\omega_S/2\pi=3$ GHz, $g/2\pi=0.02$ Hz, $T^*_2=0.4$ $\mu s$, $N=1.32\times 10^{14}$, and $\gamma_{eg}=200$ $s^{-1}$ at $T=300$ K.
Figure 13:
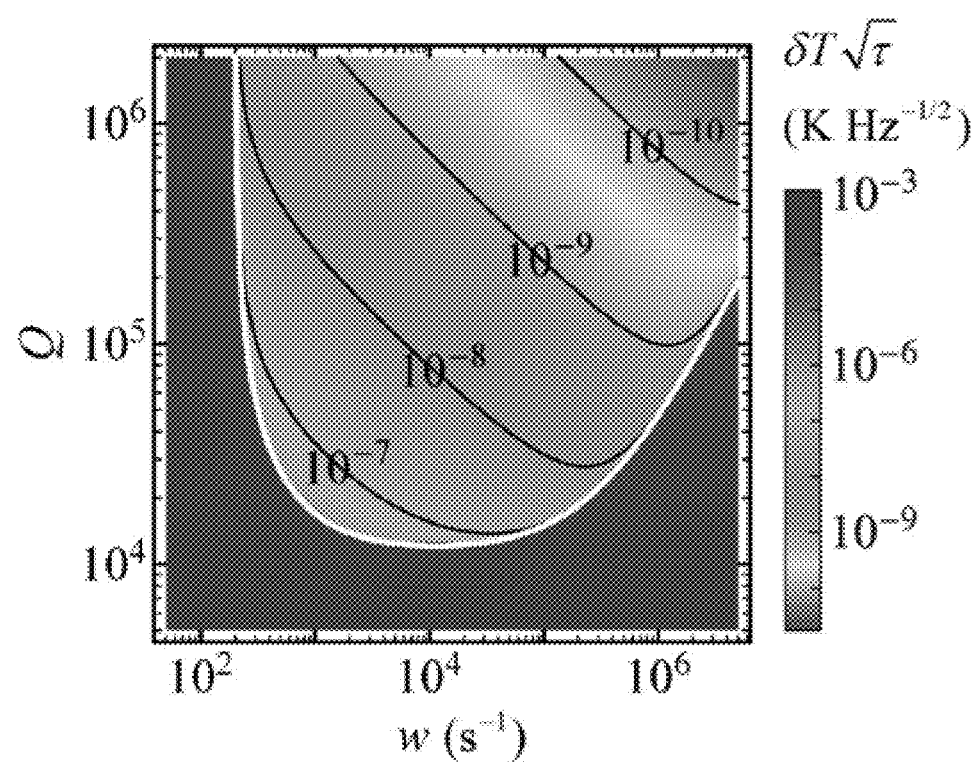
FIG. 13 shows a plot of sensitivity on temperature as functions of pump rate and cavity Q factor for a system according to an embodiment of the subject invention. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
Figure 14A:
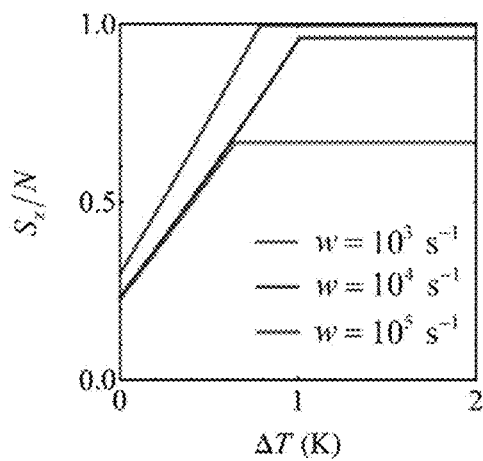
FIG. 14A shows a plot of population inversion as a function of temperature fluctuation for a system according to an embodiment of the subject invention. The three lines are for the three pump rates designated by the inset legend. The sharp changes indicate transitions between amplifying and masing. The parameters are such that $\omega_c/2\pi=\omega_s/2\pi=3$ GHz, $g/2\pi=0.02$ Hz, $T^*_2=0.4$ µs, $N=1.32\times10^{1-4}$, and $\gamma_{eg}=200$ s$^{-1}$ at T=300 K.
Figure 14B:
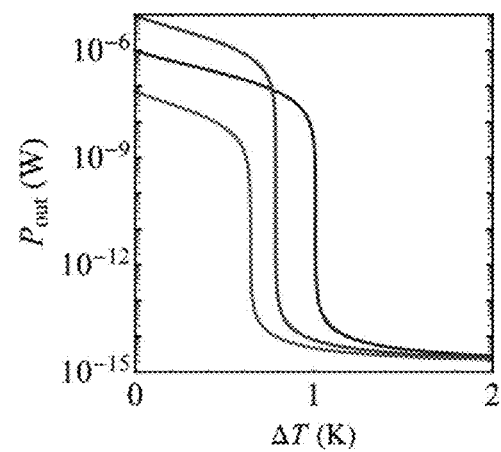
FIG. 14B shows a plot of output power as a function of temperature fluctuation for a system according to an embodiment of the subject invention. The three lines are for the three pump rates designated by the legend in FIG. 14A. The sharp changes indicate transitions between amplifying and masing. The parameters are such that $\omega_c/2\pi=\omega_s/2\pi=3$ GHz, $g/2\pi=0.02$ Hz, $T^*_2=0.4$ µs, $N=1.32\times10^{1-4}$, and $\gamma_{eg}=200$ s$^{-1}$ at T=300 K.
Figure 14C:
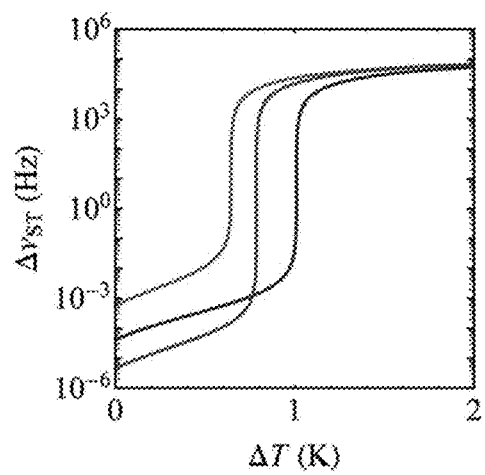
FIG. 14C shows a plot of linewidth as a function of temperature fluctuation for a system according to an embodiment of the subject invention. The three lines are for the three pump rates designated by the legend in FIG. 14A. The sharp changes indicate transitions between amplifying and masing. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
Figure 14D:
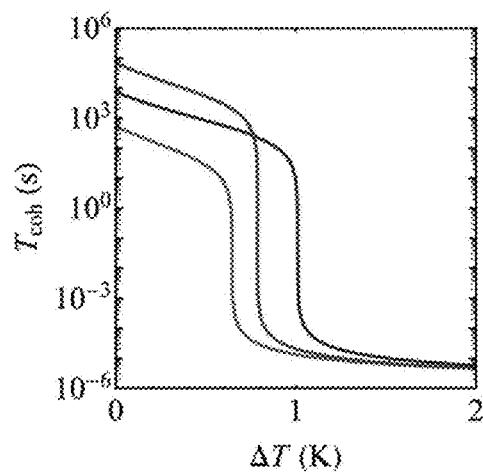
FIG. 14D shows a plot of coherence time as a function of temperature fluctuation for a system according to an embodiment of the subject invention. The three lines are for the three pump rates designated by the legend in FIG. 14A. The sharp changes indicate transitions between amplifying and masing. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.

FIG. 12 shows a plot of sensitivity on external magnetic field as functions of pump rate and cavity Q factor for the fabricated system, FIG. 13 shows a plot of sensitivity on temperature as functions of pump rate and cavity Q factor, FIGS. 14A-14D show plots of population inversion, output power, linewidth, and coherence time, respectively, each as a function of temperature fluctuation. The three lines in each plot are for the three pump rates designated by the legend inset in FIG. 14A. The sharp changes indicate transitions between amplifying and masing.

Figure 16A:
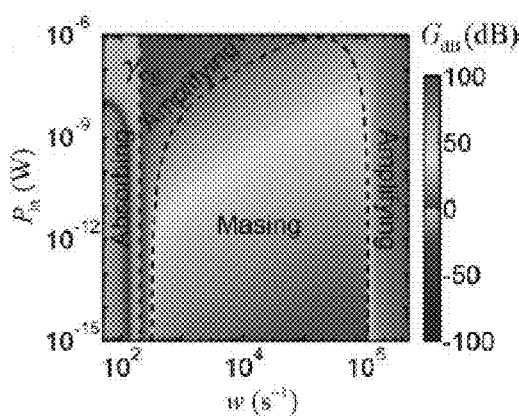
FIG. 16A shows a plot of power gain as functions of pump rate and input power for a fixed cavity Q factor of $5\times10^4$. The dashed black curve represents the masing threshold. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
Figure 16B:
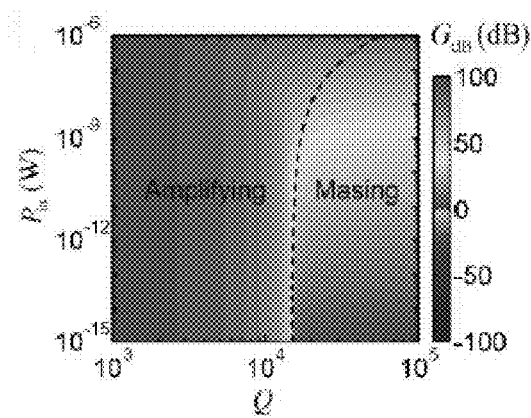
FIG. 16B shows a plot of power gain as functions of cavity Q factor and input power for a fixed pump rate of $w=10^5$ s$^{-1}$. The dashed black curve represents the masing threshold. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
Figure 16C:
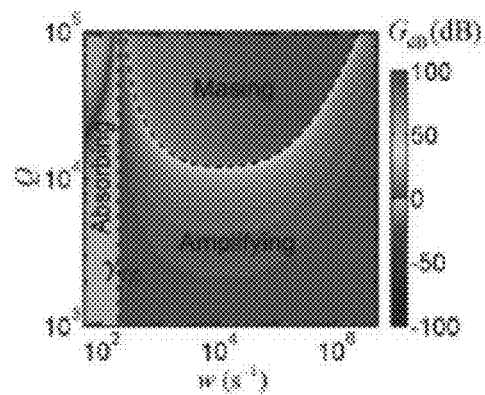
FIG. 16C shows a plot of power gain as functions of pump rate and cavity Q factor for a fixed input power of $P_{in}$, =1 fW. The dashed black curve represents the masing threshold. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.
Figure 16D:
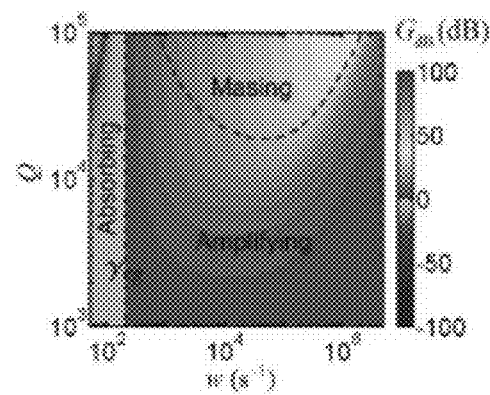
FIG. 16D shows a plot of power gain as functions of pump rate and cavity Q factor for a fixed input power of $P_{in}$, =10 nanoWatt (nW). The dashed black curve represents the masing threshold. The parameters are such that $\omega_c/2\pi=\omega_s/2\pi=3$ GHz, $g/2\pi=0.02$ Hz, $T^*_2=0.4$ µs, $N=1.32\times10^{14}$, and $\gamma_{eg}=200$ s$^{-1}$ at T=300 K.

FIGS. 15A-15C show plots of spin polarization, power gain, and noise temperature, respectively, each as a function of pump rate for the system using a resonant input signal of 1 fW and a fixed cavity Q factor of $5\times10^4$. The absorbing (for $w<\gamma_{eg}=200$ s$^{-1}$), amplifying (for 200 s$^{-1}<w<316$ s$^{-1}$ $w>1.07\times10^6$ s$^{-1}$), and masing regions (for 316 s$^{-1}<w<1.07\times 10^6$ s$^{-1}$) are marked as gray, green, and white, respectively in each of these plots. The solid lines are stable (masing) solutions and the dashed lines are the unstable (microwave amplifying) solutions in the masing region. The threshold pump power for population inversion (microwave amplifying) determined from $w=\gamma_{eg}=200$ s$^{-1}$ is estimated to be 2.7 W. The threshold pump rate for masing for maser system with cavity Q factor $Q=5\times10^4$, the threshold pump rate for masing is $w_{th}\approx1.58\gamma_{eg}=316$ s$^{-1}$, corresponding to a masing threshold pump power about 4.3 W. Note that for a good quality cavity, $w_{th}$ will be close to but larger than $\gamma_{eg}$ (e.g., $\gamma_{eg}<w_{th}<1.11\gamma_{eg}$ for $Q>2\times10^5$, see the masing boundary in FIG. 7-13, and FIG. 16C). FIG. 16A shows a plot of power gain as functions of pump rate and input power for a fixed cavity Q factor of $5\times10^4$, FIG. 16B shows a plot of power gain as functions of cavity Q factor and input power for a fixed pump rate of $w=10^5$ s$^{-1}$, FIG. 16C shows a plot of power gain as functions of pump rate and cavity Q factor for a fixed input power of $P_{in}=1$ fW, and FIG. 16D shows a plot of power gain as functions of pump rate and cavity Q factor for a fixed input power of $P_{in}=10$ nW. In each of FIGS. 16A-16D, the dashed black curve represents the masing threshold.

Referring to FIGS. 11A-11D, the system can linearly amplify the microwave signal for readily accessible parameters $Q=10^4$. The gain is about 11.7 dB with noise temperature 258 mK for $w=10^3$ s$^{-1}$, 20.0 dB gain with as low as 201 mK noise temperature for $w=10^4$ s$^{-1}$, and 14.0 dB gain with 216 mK noise temperature for $w=10^5$ s$^{-1}$, which indicate single-photon noise level.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Gordon, J. P., Zeiger, H. J. & Townes, C. H. Molecular Microwave Oscillator and New Hyperfine Structure in the Microwave Spectrum of NH3. Phys. Rev. 95, 282-284 (1954).

Mollier, J. C., Hardin, J. & Uebersfeld, J. Theoretical and experimental sensitivities of ESR spectrometers using maser techniques. Rev. Sci. Instrum. 44, 1763-1771 (1973).

Elitzur, M. Astronomical masers. Annu. Rev. Astron. Astrophys. 30, 75-112 (1992).

Clauss, R. C. & Shell, J. S. Ruby masers. In Low-Noise Systems in the Deep Space Network (ed. Reid, M. S.) (Deep Space Communication and Navigation Series, Jet Propulsion Laboratory, Caltech, 2008).

Takahashi, S., Hanson, R., van Tol, J., Sherwin, M. S. & Awschalom, D. D. Quenching spin decoherence in diamond through spin bath polarization. Phys. Rev. Lett. 101, 047601 (2008).

Pham, L. M. et al. Magnetic field imaging with nitrogen-vacancy ensembles. New J. Phys. 13, 045021 (2011).

Abe, E., Wu, H., Ardavan, A. & Morton, J. J. L. Electron spin ensemble strongly coupled to a three-dimensional microwave cavity. Appl. Phys. Lett. 98, 251108 (2011).

Kubo, Y. et al. Strong coupling of a spin ensemble to a superconducting resonator. Phys. Rev. Lett. 105, 140502 (2010).

Tetienne, J. P. et al. Magnetic-field-dependent photodynamics of single NV defects in diamond: an application to qualitative all-optical magnetic imaging. New J. Phys. 14, 103033 (2012).

Doherty, M. W. et al. The nitrogen-vacancy colour centre in diamond. Phys. Rep. 528, 1-46 (2013).

Kleppner, D. et al. Hydrogen-maser principles and techniques. Phys. Rev. 138, A972-A983 (1965).

Phillips, R. M. History of the ubitron. Nucl. Instrum. Methods A2.72, 1 (1988).

Siegman, A. E. Microwave Solid-State Masers (McGraw-Hill, 1964).

Kraus, H. et al. Room-temperature quantum microwave emitters based on spin defects in silicon carbide. Nature Phys. 10, 157-162 (2014).

Oxborrow, M., International Patent No. W0/2014/027205 A2 and A3.

Shi, F., Kong, X., Wang, P., Kong, F., Zhao, N., Liu, R.-B. & Du, J. Nature Physics 10, 21 (2014) doi:10.1038/nphys2814. Sensing and atomic-scale structure analysis of single nuclear-spin clusters in diamond.

Zhao, N. et al. Nature Nanotechnology 7,657 (2012). "Sensing single remote nuclear spins"

Zaks, B., Liu, R. B. & Sherwin, M. Nature 483, 580 (2012). "Experimental observation of electron-hole recollisions".

Zhao, N., Hu, J. L., Ho, S. W., Wan, J. T. K. & Liu, R. B. Nature Nanotechnology 6, 242 (2011). "Atomic-scale magnetometry of distant nuclear spin clusters via nitrogen-vacancy spin in diamond".

Du. J. et al. Nature 461, 1265 (2009). "Preserving spin coherence in solids by optimal dynamical decoupling".

Oxborrow, M., Breeze, J. D. & Alford, N. M. Room-temperature solid-state maser. Nature 488, 353-356 (2012).

Halbach, K. Design of permanent multipole magnets with oriented rare earth cobalt material, Nucl. Instru. Methods 169, 1-10 (1980).

Raich, H. & Blümler, P. Design and construction of a dipolar Halbach array with a homogeneous field from identical bar magnets: NMR Mandhalas. Concept Magn. Reson. B: Magn. Reson. Eng. 23B, 16-25 (2004).

Anferova, S. et al. A mobile NMR device for measurements of porosity and pore size distributions of drilled core samples. Concept Magn. Reson. B: Magn. Reson. Eng. 23B, 26-32 (2004).

Redman, D. A., Brown, S., Sands, R. H. & Rand, S. C. Spin dynamics and electronic states of N-V centers in diamond by EPR and four-wave-mixing spectroscopy. *Phys. Rev. Lett.* 67, 3420-3423 (1991).

Takahashi, S., Hanson, R., van Tol, J., Sherwin, M. S. & Awschalom, D. D. Quenching spin decoherence in diamond through spin bath polarization. *Phys. Rev. Lett.* 101, 047601 (2008).

Jarmola, A., Acosta, V. M., Jensen, K., Chemerisov, S. & Budker, D. Temperature- and magnetic-field-dependent longitudinal spin relaxation in nitrogen-vacancy ensembles in diamond. *Phys. Rev. Lett.* 108, 197601 (2012).

Toyli, D. M. et al. Measurement and control of single nitrogen-vacancy center spins above 600 K. *Phys. Rev. X* 2, 031001 (2012).

Acosta, V. M., Jarmola, A., Bauch, E. & Budker, D. Optical properties of the nitrogen-vacancy singlet levels in diamond. *Phys. Rev. B* 82, 201202 (2010).

Robledo, L., Bernien, H., van der Sar, T. & Hanson, R. Spin dynamics in the optical cycle of single nitrogen-vacancy centres in diamond. *New J. Phys.* 13 025013 (2011).

Manson, N. B., Harrison, J. P. & Sellars, M. J. Nitrogen-vacancy center in diamond: Model of the electronic structure and associated dynamics. *Phys. Rev. B* 74, 104303 (2006).

Neumann, P. et al. Excited-state spectroscopy of single NV defects in diamond using optically detected magnetic resonance. *New J. Phys.* 11, 013017 (2009).

Wrachtrup, J. Defect center room-temperature quantum processors. *Proc. Natl. Acad. Sci. U.S.A.* 107, 9479-9480 (2010).

Wee, T. L. et al. Two-photon excited fluorescence of nitrogen-vacancy centers in proton-irradiated type Ib diamond. *J. Phys. Chem. A* 111, 9379-9386 (2007).

Grezes, C. et al. Multimode storage and retrieval of microwave fields in a spin ensemble. *Phys. Rev. X* 4, 021049 (2014).

Acosta, V. M. et al. Diamonds with a high density of nitrogen-vacancy centers for magnetometry applications. *Phys. Rev. B* 80, 115202 (2009).

Ishikawa, T. et al. Optical and spin coherence properties of nitrogen-vacancy centers placed in a 100 nm thick isotopically purified diamond layer. *Nano. Lett.* 12, 2083-2087 (2012).

Balasubramanian, G. et al. Ultralong spin coherence time in isotopically engineered diamond. *Nat. Mater.* 8, 383-387 (2009).

Mizuochi, N. et al. Coherence of single spins coupled to a nuclear spin bath of varying density. *Phys. Rev. B* 80, 041201(R) (2009).

Kubo, Y. et al. Hybrid quantum circuit with a superconducting qubit coupled to a spin ensemble. *Phys. Rev. Lett.* 107, 220501 (2011).

Dicke, R. H. Coherence in spontaneous radiation processes. *Phys. Rev.* 93, 99-110 (1954).

Acosta, V. M. et al. Temperature dependence of the nitrogen-vacancy magnetic resonance in diamond. *Phys. Rev. Lett.* 104, 070801 (2010).

Dobrovinskaya, E. R., Lytvynov, L. A. & Pishchik, V. *Sapphire: Material, Manufacturing, Applications* (Springer, 2009).

Townes, C. H. Production of electromagnetic energy. U.S. Pat. No. 2,879,439A.

Arthur, A., Gordon, J. P. & White, L. D. Molecular beam maser, U.S. Pat. No. 3,214,630A.

Tibor, H. Hydrogen maser for generating, amplifying and/or frequency modulating microwave energy, U.S. Pat. No. 3,210,673A.

Daniel, K. & Ramsey, N. F. Atomic hydrogen maser., U.S. Pat. No. 3,255,423A.

Neil, G. R. & Edighoffer, J. A., Free-electron laser, U.S. Pat. No. 4,809,281A.

Mims, W. B. Solid-state maser, U.S. Pat. No. 3,001,142A.

Doğan, N., Topkaya, R., Subai, H., Yerli, Y. & Rameev, B. Development of Halbach magnet for portable NMR device. *J. Phys.: Conf. Ser.* 153, 012047 (2009).

Toyli, D. M. et al. Measurement and control of single nitrogen-vacancy center spins above 600 K. *Phys. Rev. X* 2, 031001 (2012).

Tsymbal, E. Y & utić, I. (Eds.) *Hand book of Spin Transport and Magnetism* (CRC, 2011).

Tobar, M. E. et al, Proc. IEEE Int. Freq. Contr. Symp. 1000 (1997).

Gordon, J. P., Zeiger, H. J. & Townes, C. H. The maser—new type of microwave amplifier, frequency standard, and spectrometer. *Phys. Rev.* 99, 1264-1274 (1955).

Benmessai, K. et al. Measurement of the fundamental thermal noise limit in a cryogenic sapphire frequency standard using bimodal maser oscillations. *Phys. Rev. Lett.* 100, 233901 (2008).

Widmann, M. et al. Coherent control of single spins in silicon carbide at room temperature. *Nature Mater.* 14, 164-168 (2015).

Harrison, J., Sellars, M. J. & Manson, N. B. Optical spin polarization of the N-V centre in diamond. *J. Lumin.* 107, 245-248 (2004).

Neu, E. et al. Electronic transitions of single silicon vacancy centers in the near-infrared spectral region. *Phys. Rev. B* 85, 245207 (2012).

Maze, J. R. et al. Nanoscale magnetic sensing with an individual electronic spin in diamond. *Nature* 455, 644-647 (2008).

Balasubramanian, G et al. Nanoscale imaging magnetometry with diamond spins under ambient conditions. *Nature* 455, 648-651 (2008).

Putz, S. et al. Protecting a spin ensemble against decoherence in the strong-coupling regime of cavity QED. *Nature Phys.* 10, 720-724 (2014).

le Floch, J.-M. et al. Invited article: Dielectric material characterization techniques and designs of high-Q resonators for applications from micro to millimeter-waves frequencies applicable at room and cryogenic temperatures. *Rev. Sci. Instrum.* 85, 031301 (2014).

Zhang, X., Zou, C.-L, Jiang, L. & Tang, H. X. Strongly coupled magnons and cavity microwave photons. *Phys. Rev. Lett.* 113, 156401 (2014).

Kolobov, M. I., Davidovich, L., Giacobino, E. & Fabre, C. Role of pumping statistics and dynamics of atomic polarization in quantum fluctuations of laser sources. *Phys. Rev. A* 47, 1431-1446 (1993).

Probst, S. et al. Three-dimensional cavity quantum electrodynamics with a rare-earth spin ensemble. *Phys. Rev. B* 90, 100404R (2014).

Major, F. G. *The Quantum Beat: Principles and Applications of Atomic Clocks* (Springer, 2007).

Vessot, R. F. C. The atomic hydrogen maser oscillator. *Metrologia* 42, S80-S89 (2005).

Hinkley, N. et al. An atomic clock with $10^{-18}$ instability. *Science* 341, 1215-1218 (2013).

Bohnet, J. G. et al. A steady-state superradiant laser with less than one intracavity photon. *Nature* 484, 78-81 (2012).

Wang, Z.-H. & Takahashi, S. Spin decoherence and electron spin bath noise of a nitrogen-vacancy center in diamond. *Phys. Rev. B* 87, 115122 (2013).

What is claimed is:

1. A method of providing microwave amplification, the method comprising:
   providing a maser system; and
   providing electromagnetic radiation to the maser system, thereby causing the maser system to emit microwave radiation,
   wherein the maser system comprises:
      a gain medium;
      a resonator disposed around the gain medium;
      a cavity box disposed around the resonator; and
      a magnet array disposed around the gain medium,
   wherein the gain medium comprises diamond having a plurality of nitrogen-vacancy (NV) centers,
   wherein the electromagnetic radiation is pumped into the cavity box of the maser system at a pump rate that is higher than the decay rate, and
   wherein a cavity Q factor of the maser system is below a masing threshold of the maser system, such that the maser system operates as a microwave amplifier.

2. The method according to claim 1, wherein the diamond having a plurality of NV centers is a single-crystal diamond.

3. The method according to claim 1, wherein the resonator is a sapphire dielectric resonator, and wherein the magnet array has an annulus shape.

4. The method according to claim 1, wherein the maser system further comprises a support substrate on which the resonator is disposed, wherein the support substrate is disposed within the cavity box.

5. The method according to claim 1, wherein the system has a cavity Q factor of at least 10,000.

6. The method according to claim 1, wherein the NV concentration within the diamond gain medium is less than 100 parts per million (ppm).

7. The method according to claim 1, wherein the cavity box includes an opening to receive radiation, and
   wherein the maser system further comprises an optical pump disposed outside the cavity box and configured to provide electromagnetic radiation to the gain medium through the opening in the cavity box.

8. The method according to claim 7, wherein the optical pump is an optical laser, and wherein the electromagnetic radiation is visible light.

9. The method according to claim 1, wherein the magnet array provides a homogenous magnetic field to the gain medium, and wherein the homogenous magnetic field is at least 1,028 Gauss.

10. The method according to claim 1, wherein the maser system operates in continuous-wave mode at room temperature, and wherein a power gain of the maser system is at least 6 dB.

11. A method of providing microwave amplification, the method comprising:
    providing a maser system; and
    providing electromagnetic radiation to the maser system thereby causing the maser system to emit microwave radiation,
    wherein the maser system, comprises:
    a gain medium;
    a resonator disposed around the gain medium; and
    a cavity box disposed around the resonator,
    wherein the gain medium comprises diamond having a plurality of nitrogen-vacancy (NV) centers,
    wherein the electromagnetic radiation is pumped into the cavity box of the maser system at a pump rate that is higher than the decay rate, and
    wherein a cavity Q factor of the maser system is below a masing threshold of the maser system, such that the maser system operates as a microwave amplifier.

12. The method according to claim 11, wherein the diamond having a plurality of NV centers is a single-crystal diamond, wherein the system has a cavity Q factor of at least 10,000, and wherein the NV concentration within the diamond gain medium is less than 100 parts per million (ppm).

13. The method according to claim 11, wherein the cavity box includes an opening to receive radiation, wherein the maser system further comprises an optical pump disposed outside the cavity box and configured to provide electromagnetic radiation to the gain medium through the opening in the cavity box, wherein the optical pump is an optical laser, and wherein the electromagnetic radiation is visible light.

14. The method according to claim 11, wherein the maser system operates in continuous-wave mode at room temperature, and wherein a power gain of the maser system is at least 6 dB.

* * * * *

UNITED STATES PATENT AND TRADEMARK OFFICE
CERTIFICATE OF CORRECTION

PATENT NO. : 9,966,720 B2
APPLICATION NO. : 15/261300
DATED : May 8, 2018
INVENTOR(S) : Renbao Liu and Liang Jin It is certified that error appears in the above-identified patent and that said Letters Patent is hereby corrected as shown below:

In the Specification

Column 1,
Line 10, "$N = 1.32\times10^{1-4}$," should read --$N = 1.32\times10^{14}$,--.
Line 18, "$N = 1.32\times10^{1-4}$," should read --$N = 1.32\times10^{14}$,--.

Column 5,
Line 27, "reach 135 is at" should read --reach 135 µs at--.

Column 7,
Line 57, "$P_{pump}=(S/\sigma)(4w),$" should read --$P_{pump} = \hbar\omega_p (S/\sigma)(4w),$--.

Column 9,
Line 20, "$+ ig(a^*\delta S_- - a\delta \hat{S}_+) + \hat{F}_e,$" should read
--$+ ig(a^*\delta \hat{S}_- - a\delta \hat{S}_+) + \hat{F}_e,$--.

Line 24, "$- ig(a^*\delta S_- - a\delta \hat{S}_+) + \hat{F}_g,$" should read
--$- ig(a^*\delta \hat{S}_- - a\delta \hat{S}_+) + \hat{F}_g,$--.

Signed and Sealed this
Fifth Day of March, 2019

Andrei Iancu
*Director of the United States Patent and Trademark Office*

CERTIFICATE OF CORRECTION (continued)

U.S. Pat. No. 9,966,720 B2

Column 10,

Line 30, "($m_s = 1$ or" should read --($m_s = 0$ or--.

Line 40, "$|g\rangle = |1\rangle$" should read --$|g\rangle = |-1\rangle$--.

Line 45, "$H_1 = \Sigma_{j=1}^N g_j(\hat{a}\hat{s}_j^+ + \hat{a}^\dagger \hat{s}_j^-),$" should read
-- $H_1 = \sum_{j=1}^N g_j \left(\hat{a}\hat{s}_j^+ + \hat{a}^\dagger \hat{s}_j^-\right)$ --.

Line 47, "$\hat{s}_j^-,$ and $g_j$" should read -- $\hat{s}_j^- = \left(\hat{s}_j^+\right)^\dagger$ and $g_j$--.

Line 51, "$\hat{S}_\pm \equiv \Sigma_{j=1}^N \hat{s}_j^\pm,$" should read -- $\hat{S}_\pm \equiv \sum_{j=1}^N \hat{s}_j^\pm$ --.

Line 53, "$[\hat{S}_+, \hat{S}_-] = \Sigma_{j=1}^N (|e\rangle$" should read -- $\left[\hat{S}_+, \hat{S}_-\right] = \sum_{j=1}^N \left(|e\rangle\right.$ --.

Line 55, "$S_z \equiv \langle \hat{S}_z$ can" should read -- $S_z \equiv \langle \hat{S}_z \rangle$ can--.

Line 65, "$\sqrt{1/N}\Sigma_{j=1}^N |g\rangle_1 \cdots$" should read -- $\sqrt{1/N} \sum_{j=1}^N |g\rangle_1 \cdots$ --.

Column 13,

Line 47, "$(\langle \hat{S}_+ \hat{S}_- \rangle)/S_z = \Sigma_{j=1}^N \langle \hat{s}_j^+ \hat{s}_j^- \rangle$" should read
-- $(\langle \hat{S}_+ \hat{S}_- \rangle)/S_z = \sum_{j=1}^N \langle \hat{s}_j^+ \hat{s}_j^- \rangle$ --.

Column 14,

Line 59, "$P_{pump} = \hbar\omega_{p1}(S/\sigma)(4w)$" should read
-- $P_{\text{pump}} = \hbar\omega_p (S/\sigma)(4w)$ --.

CERTIFICATE OF CORRECTION (continued)

Column 16,
Lines 8-9, "40 W (14)>1/$T_1$ =2,941 s$^{-1}$)" should read --40 W ($w > 1/T_1$ = 2,941 s$^{-1}$)--.
Line 19, "mode ($\kappa_e << \kappa_S$)." should read --mode ($\kappa_c << \kappa_S$).--.

Column 17,
Line 43, "N-to-NV conversion" should read --N-to-NV$^-$ conversion--.

Column 3,
Lines 52-53, "$\tan\left(\dfrac{h}{2}\sqrt{k_0^2\varepsilon_s - \dfrac{x_{01}^2}{r^2}}\right)$" should read --$\tan\left(\dfrac{h}{2}\sqrt{k_0^2\varepsilon_r - \dfrac{x_{01}^2}{r^2}}\right)$--.

Column 19,
Lines 9-10, "$+D\dfrac{\Delta\varepsilon_r}{\varepsilon_s}$" should read --$+D\dfrac{\Delta\varepsilon_r}{\varepsilon_r}$--.

Column 20,
Line 33, "$\sigma \approx 3.1 \times 10^{17}$" should read --$\sigma \approx 3.1 \times 10^{-17}$--.

Column 21,
Line 20, "$\cdot(\gamma_{NV}{}^2\mu_0\hbar/12)\cdot$" should read --$\cdot(\gamma_{NV}^2\mu_0\hbar/12)\cdot$--.
Line 35, "$\hat{F}_{S/e}$" should read --$\hat{F}_{S/c}$--.
Line 41, "$\hat{N}_{e/g}=\hat{N}_{e/g}\alpha\delta\hat{N}_{e/g}$," should read --$\hat{N}_{e/g} = N_{e/g} + \delta\hat{N}_{e/g}$,--.
Line 42, "$=S_\pm e^{\pm i\alpha x}+\delta\hat{S}_\pm, \hat{\alpha}=\alpha e^{-i\alpha x}$" should read --$=S_\pm e^{\pm i\omega t}+\delta\hat{S}_\pm, \hat{a}=ae^{-i\omega t}$--.

CERTIFICATE OF CORRECTION (continued)
U.S. Pat. No. 9,966,720 B2

Column 22,

Line 27, "$+\gamma_{eg}\langle N_e\rangle-$" should read -- $+\gamma_{eg}\langle \hat{N}_e\rangle-$ --.

Column 23,

Lines 2-3, "$\dfrac{\dfrac{\kappa_S+\kappa_c}{4g^2}+\dfrac{1}{w+\gamma}}{(1-N^{-1})\dfrac{1}{\kappa_S}+\dfrac{1}{\kappa_c}}$" should read -- $\dfrac{\dfrac{\kappa_S+\kappa_c}{4g^2}+\dfrac{1}{w+\gamma_{eg}}}{(1-N^{-1})\dfrac{1}{\kappa_S}+\dfrac{1}{\kappa_c}}$ --.

Lines 7-8, "$N+\dfrac{\dfrac{\kappa_S+\kappa_c}{4g^2}-\dfrac{1}{w+\gamma}}{(1-N^{-1})\dfrac{1}{\kappa_S}+\dfrac{1}{\kappa_c}}=0.$" should read -- $N\dfrac{\dfrac{\kappa_S+\kappa_c}{4g^2}-\dfrac{1}{w-\gamma_{eg}}}{(1-N^{-1})\dfrac{1}{\kappa_S}+\dfrac{1}{\kappa_c}}=0.$ --.

Line 62, "$2Ng^2T^*_2 \gg \kappa_e,$" should read -- $2Ng^2T^*_2 \gg \kappa_c,$ --.

Column 24,

Line 15, "$+\hat{F}_e,$" should read -- $+\hat{F}_g,$ --.
Line 24, "(t)dt try for δâ(t) and" should read --(t)d$t$ for δâ($t$) and--.

Column 4,

Line 11, "$\left[\dfrac{g^2N\kappa_S\left(\dfrac{\kappa_S^2}{4}+\Omega^2\right)\kappa_c(1+2n_{th})}{4n_c\left(\dfrac{\kappa_c+\kappa_S}{2}\right)^2}\right].$" should read -- $\left[\dfrac{g^2N\kappa_S+\left(\dfrac{\kappa_S^2}{4}+\Omega^2\right)\kappa_c(1+2n_{th})}{4n_c\left(\dfrac{\kappa_c+\kappa_S}{2}\right)^2}\right].$ --.

CERTIFICATE OF CORRECTION (continued)
U.S. Pat. No. 9,966,720 B2

Lines 22-24, "$= \frac{1}{2\pi}\int_{\infty}^{+\infty}$" should read --$= \frac{1}{2\pi}\int_{-\infty}^{+\infty}$--.

Line 37, "For t>>2/($\kappa_c$+$\kappa_S$," should read --For $t \gg 2/(\kappa_c + \kappa_S)$,--.

Column 26,
Line 1, "denoted as $\Omega_{S,c}=\omega_{in}-\omega_{S,c}$," should read --denoted as $\delta_{S,c} = \omega_{in} - \omega_{S,c}$,--.
Line 27, "i.e., The" should read --i.e., $\kappa_{ex} = \kappa_c$. The--.

Column 27,
Line 53, "$\delta\hat{s}_{out}(t)=\delta\hat{s}_{in}-\sqrt{\kappa_c^{ex}}\delta\hat{a}(t)$" should read
--$\delta\hat{s}_{out}(t) = \delta\hat{s}_{in}(t) - \sqrt{\kappa_c^{ex}}\delta\hat{a}(t)$--.

Lines 54-55, "is $\delta\hat{s}_{out}-\sqrt{\kappa_c^{ex}}\delta\hat{a}(t)$ corresponding" should read
--is $\hat{s}_{out}(t) = -\sqrt{\kappa_c^{ex}}\hat{a}(t)$, corresponding--.

Column 28,
Lines 65-66, "($\kappa_c + \kappa_S$)/2], the temperature" should read --($\kappa_c + \kappa_S$), $\kappa_S$/2], the temperature--.

Column 29,
Lines 1-2, "$\frac{1}{g_0}\frac{\kappa_c+\kappa_S}{\kappa_c}\sqrt{\gamma_{ST}} = \frac{1}{g_0}\frac{\kappa_c+\kappa_S}{\kappa_S}\sqrt{\frac{2}{T}}$" should read
--$\frac{1}{g_0}\frac{\kappa_c+\kappa_S}{\kappa_S}\sqrt{\gamma_{ST}} = \frac{1}{g_0}\frac{\kappa_c+\kappa_S}{\kappa_S}\sqrt{\frac{2}{T}}$--.

Column 38,
Line 15, "& utić, I." should read --& Žutić, I.--.